United States Patent
Meng et al.

(10) Patent No.: US 12,235,466 B2
(45) Date of Patent: Feb. 25, 2025

(54) LIGHT MODULATOR AND ITS MODULATION METHOD

(71) Applicant: Shanghai North Ocean Photonics Co., Ltd., Shanghai (CN)

(72) Inventors: Yuhuang Meng, Shanghai (CN); He Huang, Shanghai (CN); Xinye Lou, Shanghai (CN); Tao Lin, Shanghai (CN)

(73) Assignee: Shanghai North Ocean Photonics Co., Ltd., Shanghai (CN)

( * ) Notice: Subject to any disclaimer, the term of this patent is extended or adjusted under 35 U.S.C. 154(b) by 0 days.

(21) Appl. No.: 17/399,065

(22) Filed: Aug. 11, 2021

(65) Prior Publication Data

US 2022/0050301 A1 Feb. 17, 2022

(51) Int. Cl.
*G02B 27/09* (2006.01)
*G02B 3/00* (2006.01)

(52) U.S. Cl.
CPC ....... *G02B 27/0983* (2013.01); *G02B 3/0006* (2013.01)

(58) Field of Classification Search
CPC .......................... G02B 27/0983; G02B 3/0006
USPC ........................................ 359/619, 708, 741
See application file for complete search history.

(56) References Cited

U.S. PATENT DOCUMENTS

2017/0159906 A1* 6/2017 Wang .................... G02B 1/041

* cited by examiner

*Primary Examiner* — William Choi
(74) *Attorney, Agent, or Firm* — David & Raymond Patent Firm; Raymond Y Chan

(57) ABSTRACT

A light modulator includes a beam homogenizer having microstructure, and a curved light transmitting substrate having at least one curving surface, wherein the beam homogenizer is arranged on the curving surface of the curved light transmitting substrate to configure the microstructure of the beam homogenizer on the curving surface of the curved light transmitting substrate.

20 Claims, 17 Drawing Sheets

LIGHT MODULATOR AND ITS MODULATION METHOD

CROSS REFERENCE OF RELATED APPLICATION

This application is a non-provisional application that claims priority under 35 U.S.C. § 119 to Chinese applications, application numbers CN202010802247.0, CN2021100025899, CN2021100030350, and 202110003037X, filed Aug. 11, 2020, which are incorporated herewith by reference in their entirety.

BACKGROUND OF THE PRESENT INVENTION

Field of Invention

The present invention relates to an optical field, and more particularly to a light modulator and its modulation method.

Description of Related Arts

A range imaging system, such as Lidar, ToF camera, etc, requires regional lighting on a target area. However, once the target area is off the optical axis of the detection light source, problems such as distortion of the detection area, reduced energy utilization, and poor uniformity will often occur. Specifically, the distortion is an off-axis aberration that is caused by the change of the lateral magnification with the increase of the field of view. Particularly, the center direction of the detection light will be deflected at different angles when the amount of off-axis is different. In other words, the greater the amount of off-axis, the greater the angle that the center direction of the detection light deviates from the optical axis, and the greater the distortion of the illumination area. Therefore, distortion needs precise correction for every individual angle.

However, due to the detection light with different amount of off-axis, the amount of distortion of the illumination area is different. The existing technologies require complicated optical systems in order to solve the above mentioned problem. Generally speaking, the existing technologies involve multiple independent optical components and have disadvantages of inconvenience to assemble and adjust, large module size, and higher cost, such that the existing technologies are hard to promote and to be widely used.

SUMMARY OF THE PRESENT INVENTION

The invention is advantageous in that it provides a light modulator and its modulation method, which is configured to homogenize the light emitted by the light source, such that the light can uniformly illuminate the corresponding detection area, and improve the utilization rate of light energy.

Another advantage of the invention is to provide a light modulator and its modulation method, which is configured to reduce the distortion of the illumination light zone formed by the light from the light source, and to effectively reduce the distortion caused by the light at the edge portion so as to enhance the detection of the device incorporated with the light modulator.

Another advantage of the invention is to provide a light modulator and its modulation method, wherein a beam homogenizer of the light modulator is formed on a curving surface of a curved light transmitting substrate to homogenize the light beam and to reduce the distortion in the illumination light zone at the same time.

Another advantage of the invention is to provide a light modulator and its modulation method, wherein two beam homogenizers of the light modulator are respectively formed on two opposed surface of the curved light transmitting substrate to simplify the microstructure of the beam homogenizer for reducing the manufacturing difficulty, such that two simple microstructures are formed via the beam homogenizers.

Another advantage of the invention is to provide a light modulator and its modulation method, wherein the light modulator is able to homogenize the light and to deflect the central direction of the light from the light source to different light zones, such that the light from different zones are evenly projected to the corresponding zones to improve the window efficiency.

Another advantage of the invention is to provide a light modulator and its modulation method, which is able to generate the illumination light zone with less distortion according to different positions of the light sources, such that it is unnecessary to individually correct the distortion based on the position or angle of the light source.

Another advantage of the invention is to provide a light modulator and its modulation method, wherein the light modulation area of the light modulator is arranged to be divided into a plurality of light modulation sub-areas, wherein at least one of the light modulation sub-areas is set corresponding to at least one of the illumination light zones, such that the lights from the light sources in different zones are homogenized after passing through the corresponding light modulation sub-areas.

Another advantage of the invention is to provide a light modulator and its modulation method, wherein no expensive or complicated structure is required to employ in the present invention in order to achieve the above mentioned objects.

According to the present invention, the foregoing and other objects and advantages are attained by a light modulator, comprising:
  a beam homogenizer having a microstructure; and
  a curved light transmitting substrate having at least one curving surface, wherein the beam homogenizer is arranged on the curving surface of the curved light transmitting substrate to configure the microstructure of the beam homogenizer on the curving surface of the curved light transmitting substrate.

In one embodiment, the curved light transmitting substrate has a light incoming surface and a light outgoing surface opposite to the light incoming surface, wherein the light incoming surface of the curved light transmitting substrate is curved to serve as the curving surface of the curved light transmitting substrate, wherein the beam homogenizer is formed on the light incoming surface of the curved light transmitting substrate.

In one embodiment, two beam homogenizers are provided that one of the beam homogenizers is formed on the light incoming surface of the curved light transmitting substrate while another beam homogenizer is formed on the light outgoing surface of the curved light transmitting substrate.

In one embodiment, the light outgoing surface of the curved light transmitting substrate can be a flat surface or a curved surface.

In one embodiment, one of the beam homogenizers is formed on one surface of the curved light transmitting substrate in a first direction while another beam homogenizer is formed on an opposed surface of the curved light transmitting substrate in a second direction, wherein the first direction and the second direction are orthogonal.

In one embodiment, the curved light transmitting substrate has a light incoming surface and a light outgoing surface opposite to the light incoming surface, wherein the light incoming surface of the curved light transmitting substrate is curved to serve as the curving surface of the curved light transmitting substrate, wherein the beam homogenizer is formed on the light incoming surface of the curved light transmitting substrate.

In one embodiment, the curved light transmitting substrate is a curved lens, wherein the beam homogenizer is overlapped on the curving surface of the curved light transmitting substrate.

In one embodiment, the curved light transmitting substrate is a curved lens, wherein the beam homogenizer is integrally formed on the curving surface of the curved light transmitting substrate.

In one embodiment, the beam homogenizer is embodied as a homogenizing layer based on the principle of light refraction or a homogenizing layer based on the principle of light diffraction.

In one embodiment, the beam homogenizer is selected from a group consisting of a micro lens array composed of convex lenses, a micro lens array composed of concave lenses, a regular micro lens array, a random micro lens array, a spherical lens array, and an aspheric lens array.

In one embodiment, the curved light transmitting substrate is selected from a group consisting of plano-convex aspheric cylindrical lenses, spherical lenses, aspheric lenses, plano-convex lenses, plano-concave lenses, biconvex lenses, biconcave lenses, and meniscus lenses.

In one embodiment, the beam homogenizer uses a random micro lens array, wherein the surface configuration of each micro lens thereof is set as:

$$z = \frac{cr^2}{1 + \sqrt{1-(1+k)c^2r^2}} + \sum_{i=1}^{N} A_i E_i(x, y)$$

wherein $$\frac{cr^2}{1 + \sqrt{1-(1+k)c^2r^2}}$$

is a basic aspheric term, where c is the curvature and k is the conic coefficient;

$$\sum_{i=1}^{N} A_i E_i(x, y)$$

is the extended polynomial, where N is the number of polynomials, Ai is the coefficient of the $i^{th}$ extended polynomial term; the polynomial Ei(x,y) is the power series of x and y.

In one embodiment, the beam homogenizer is a one-dimensional regular micro lens array, wherein the surface configuration of the one-dimensional regular micro lens array is set as:

$$z = \frac{c_x x^2}{1 + \sqrt{1-(1+k_x)x^2}} \text{ or } z = \frac{c_y y^2}{1 + \sqrt{1-(1+k_y)y^2}}$$

wherein the value ranges of $c_x$ and $c_y$ are set between −40 mm-1 and 40 mm$^{-1}$; the value ranges of $k_x$ and $k_y$ are set between −100 and 100.

In one embodiment, the light modulator is constructed to have one or more light modulation portions, wherein the light modulation portions are correspondingly set to one or more illumination light sources.

In one embodiment, the diffusion angle of the light modulator is set as:

$$\theta_{DF-X} > 2 * \arctan\left(\frac{Gap_W}{2f_x}\right);$$

$$\theta_{DF-Y} > 2 * \arctan\left(\frac{Gap_H}{2f_y}\right)$$

wherein $\theta_{Df-X}$ and $\theta_{Df-Y}$ are the diffusion angles of the light modulator, $Gap_W$ and $Gap_H$ are the intervals between adjacent illumination light sources, and $f_x$ and $f_y$ are the focal lengths of the light modulator.

In one embodiment, the microstructure surface configuration of the beam homogenizer is controlled to adjust the light field distribution.

In accordance with another aspect of the invention, the present invention comprises a modulation method of a light modulator, comprising the following steps.

Homogenize a light beam through at least one beam homogenizer element, having a microstructure, of the light modulator.

Deflect the light beam through a curved light transmitting substrate of the light modulator, and adjust a divergence angle range of the light beam, wherein the curved light transmitting substrate has at least one curving surface, wherein the beam homogenizer is correspondingly formed on the curving surface of the curved light transmitting substrate to configure the microstructure of the beam homogenizer on the curving surface of the curved light transmitting substrate.

Still further objects and advantages will become apparent from a consideration of the ensuing description and drawings.

These and other objectives, features, and advantages of the present invention will become apparent from the following detailed description, the accompanying drawings, and the appended claims.

DETAILED DESCRIPTION OF THE PREFERRED EMBODIMENT

The following description is disclosed to enable any person skilled in the art to make and use the present invention. Preferred embodiments are provided in the following description only as examples and modifications will be apparent to those skilled in the art. The general principles defined in the following description would be applied to other embodiments, alternatives, modifications, equivalents, and applications without departing from the spirit and scope of the present invention.

It is appreciated that the terms "longitudinal", "transverse", "upper", "lower", "front", "rear", "left", "right", "vertical", "horizontal", "top", "bottom", "exterior", and "interior" in the following description refer to the orientation or positioning relationship in the accompanying drawings for easy understanding of the present invention without limiting the actual location or orientation of the present invention. Therefore, the above terms should not be an actual location limitation of the elements of the present invention.

It is appreciated that the terms "one", "a", and "an" in the following description refer to "at least one" or "one or more" in the embodiment. In particular, the term "a" in one embodiment may refer to "one" while in another embodiment may refer to "more than one". Therefore, the above terms should not be an actual numerical limitation of the elements of the present invention.

The existing three-dimensional sensing device, such as smart phones, tablet computers, lidar, wearable devices, somatosensory interactive equipment, VR equipment, AR equipment, industrial testing equipment, ranging equipment or stereo imaging equipment, generally comprises a complicated optical system. Accordingly, such system comprises a plurality of independent optical components to correct the off-axis distortion, wherein such system has disadvantages of inconvenience to assemble and adjust, large modular size, and higher cost, such that the existing technologies are hard to promote and to be widely used. As shown in FIGS. 1 to 3B, a light field modulator 10 of a light modulator according to a preferred embodiment of the present invention is illustrated to solve the above mentioned problems. The light field modulator 10 is configured for modulating a light beam to achieve a uniform light effect and to correct an off-axis distortion at the same time.

Figure 1:
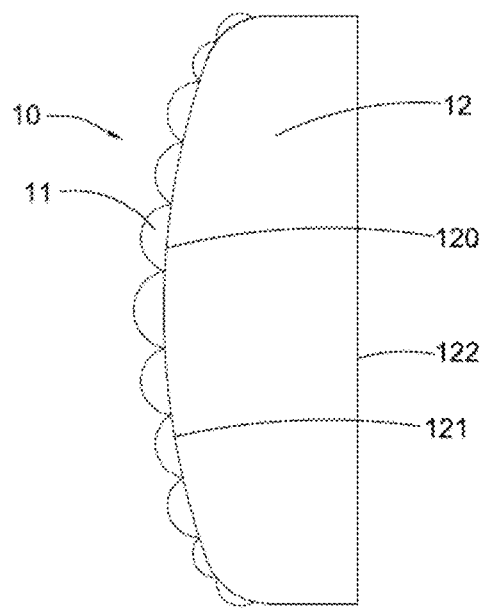
FIG. 1 is a schematic view of a light field modulator of a light modulator according to a preferred embodiment of the present invention.
Figure 2:
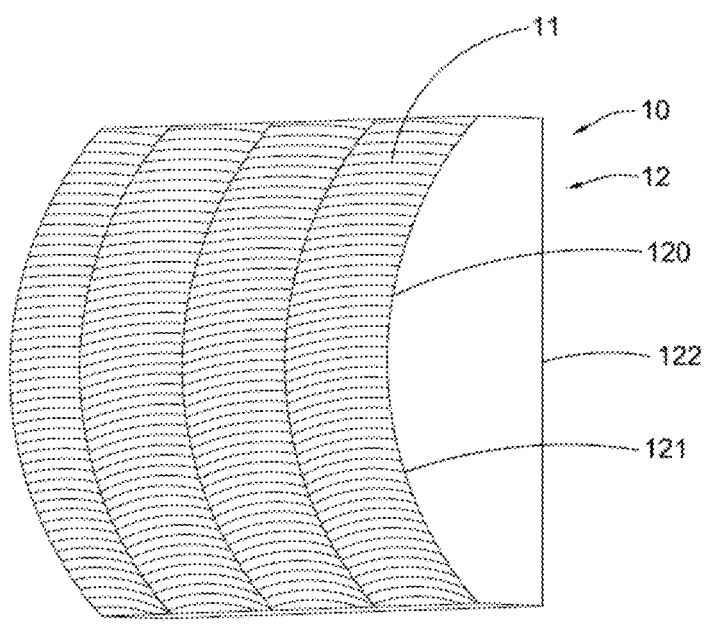
FIG. 2 is a perspective view of the light field modulator of the light modulator according to the above preferred embodiment of the present invention.
Figure 3:
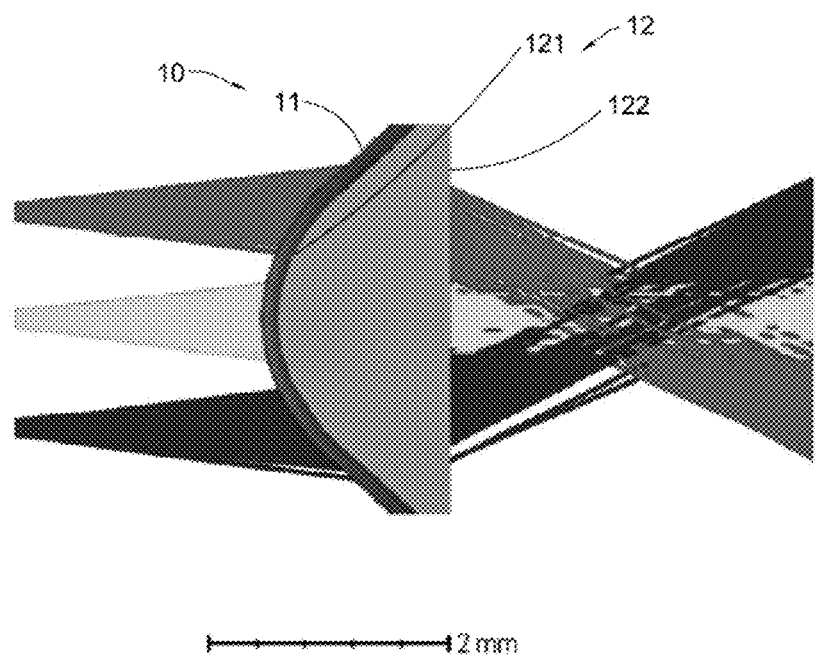
FIG. 3 is a schematic view of the light field modulator of the light modulator of the light modulator according to the above preferred embodiment of the present invention, illustrating an optical light path through the light modulator.

Specifically, as shown in FIGS. 1 to 3, the light field modulator 10 comprises at least one beam homogenizer 11 and a curved light transmitting substrate 12 having at least one curving surface 120, wherein the beam homogenizer 11 is formed on the curving surface 120 of the curved light transmitting substrate 12. Preferably, the microstructures of the beam homogenizers 11 are arranged along the curving surface 120 of the curved light transmitting substrate 12. In other words, the beam homogenizer 11 is integrally formed with the curved light transmitting substrate 12, such that the light field modulator 10 is implemented as a curved light modulator. It should be understood that the curved light transmitting substrate 12 can be, but is not limited to, made of transparent materials such as glass, resin, plastic, polymer materials, etc., as long as it can allow light beams to pass through.

It is worth mentioning that since the beam homogenizer 11 can homogenize the light beam, and the curved light transmitting substrate 12 can deflect the light beam to adjust a divergence angle range of the light beam. Therefore, modulating the light beam by the light field modulator 10 is to uniformly illuminate the target area, to reduce the off-axis distortion, and to minimize the energy loss, so as to enhance the uniformity of illumination and energy utilization, and to ensure a sufficient high window efficiency.

In one example, as shown in FIG. 1, the curved light transmitting substrate 12, which is embodied, but not limited to, as a curved lens, has a light incoming surface 121 and a light outgoing surface 122 opposite to the light incoming surface 121, wherein the light incoming surface 121 of the curved light transmitting substrate 12 is curved to serve as the curving surface 120 of the curved light transmitting substrate 12, while the light outgoing surface 122 of the curved light transmitting substrate 12 is flat. The beam homogenizer 11 is disposed on the light incoming surface 121 of the curved light transmitting substrate 12, i.e. the beam homogenizer 11 is formed on the curving surface 120 of the curved light transmitting substrate 12. It should be understood that the light beam enters from the light incoming surface 121 of the curved light transmitting substrate 12 and exits from the light outgoing surface 122 of the curved light transmitting substrate 12.

It is appreciated that in another example, the light incoming surface 121 of the curved light transmitting substrate 12 can be configured as a flat surface while the light outgoing surface 122 of the curved light transmitting substrate 12 can be configured as a curved surface to serve as the curving surface 120 of the curved light transmitting substrate 12, wherein the beam homogenizer 11 is disposed on the light outgoing surface 122 of the curved light transmitting substrate 12.

More specifically, in a specific example of the present invention, the beam homogenizers 11 are attached to the curved light transmitting substrate 12 along the curvature thereof.

It should be appreciated that in another specific example of the present invention, the beam homogenizers 11 are integrally formed on the curving surface 120 of the curved light transmitting substrate 12. In other words, the beam homogenizers 11 and the curved light transmitting substrate 12 are integrated to form a single member. Therefore, the light field modulator 10 of the present invention is highly integrated, easy to assemble and adjust, light weight, small size, and low cost, so as to enable the light filed modulator 10 equipping with the electronic device or system in an integrated and light weight manner.

It is worth mentioning that a person who skilled in the art can understand that the above specific integration structure of the beam homogenizer 11 and the curved light transmitting substrate 12 is an example, and should not be limited for the light modulator 10 of the present invention.

Furthermore, the beam homogenizer 11 should not be limited, for example, but not limited to, as a micro lens array constructed by convex lenses, micro lens array composed of concave lenses, regular micro lens array, random micro lens array, spherical lens array or aspheric lens array, etc.

Furthermore, the curved light transmitting substrate 12 (such as the curved lens) should not be limited, for example, but not limited to, as a plano-convex aspheric cylindrical lens, such as a spherical lens, aspherical lens, plano-convex lens Plano-concave lenses, bi-convex lenses, bi-concave lenses, meniscus lenses, etc., wherein the aspheric lens surface is expressed as:

$$z = \frac{\rho^2}{R\left(1 + \sqrt{1 - \frac{(1+k)(\rho^2)}{R^2}}\right)} + A_4\rho^4 + A_6\rho^6 + A_8\rho^8 + A_{10}\rho^{10} + A_{12}\rho^{12} + \ldots$$

In one example of the present invention, the curved lens is implemented as a plano-convex aspheric cylindrical lens, and its surface shape is set as:

$$z = \frac{Y^2}{R\left(1 + \sqrt{1 - \frac{(1+k)(Y^2)}{R^2}}\right)} + A_4Y^4 + A_6Y^6 + A_8Y^8 + A_{10}Y^{10} + A_{12}Y^{12}$$

wherein, the parameters of the curved lens as shown in Table 1.

TABLE 1

| R | 1.36 mm |
|---|---|
| k | −0.792 |
| $A_4$ | −4.73E−03 |
| $A_6$ | −8.00E−04 |
| $A_8$ | −3.34E−04 |
| $A_{10}$ | 2.24E−04 |
| $A_{12}$ | −6.08E−05 |

According to the preferred embodiment, the beam homogenizer 11 provided on the curved lens is a micro lens array, and the direction of the micro lens is aligned with the surface normal of the curved lens, wherein the surface configuration of each micro lens is set as:

$$z = \frac{c_x x^2 + c_y y^2}{1 + \sqrt{1 - (1+k_x)c_x^2 x^2 - (1+k_y)c_y^2 y^2}}$$

wherein $c_x$ and $c_y$ are the curvatures of the micro lens in the X and Y directions, and $k_x$ and $k_y$ are the corresponding conic coefficients. The parameters of the micro lens are shown in Table 2. The light path diagram corresponding to this specific example is shown in FIG. 3.

TABLE 2

| $c_x$ | −8.84 mm$^{-1}$ |
|---|---|
| $c_y$ | −2.5 mm$^{-1}$ |
| $k_x$ | −1.12 |
| $k_y$ | −1.08 |

In one example of the present invention, the light field modulator 10 can incorporate with a random micro lens array, wherein the surface configuration of each micro lens is set as:

$$z = \frac{cr^2}{1 + \sqrt{1 - (1+k)c^2r^2}} + \sum_{i=1}^{N} A_i E_i(x, y)$$

wherein, $$\frac{cr^2}{1 + \sqrt{1 - (1+k)c^2r^2}}$$

is a basic aspheric term, where c is the curvature and k is the conic coefficient, $$\sum_{i=1}^{N} A_i E_i(x, y)$$

is an extended polynomial, where N is the number of polynomials, and Ai is the coefficient of the $i^{th}$ extended polynomial term. The polynomial $E_i(x,y)$ is the power series of x and y. The first item is x, then y, then x*x, x*y, y*y, . . . , etc.

It is worth mentioning that different microstructures of the beam homogenizer 11 of the light field modulator 10 can incorporate with different surface parameters. After the modulation of the different microstructures of the light field modulator 10, the corresponding light beam can illuminate the corresponding target area to fulfill specific requirements. In other words, the present invention provides a predetermined flexibility to adjust the light field distribution by controlling the surface configuration of the microstructure in the light field modulator 10 so as to meet the specified light field requirements.

Figure 4A:
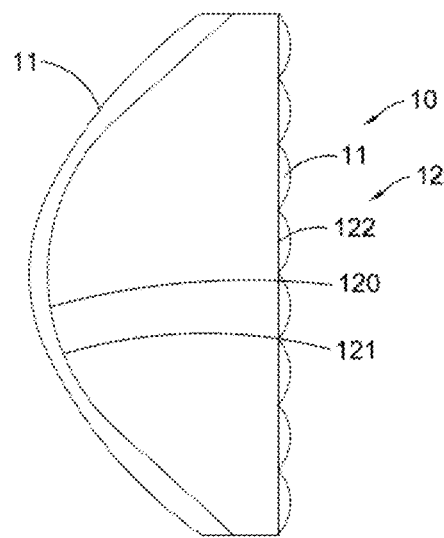
FIGS. 4A to 4C illustrate a first alternative mode of the light field modulator of the light modulator according to the above preferred embodiment of the present invention.
Figure 4B:
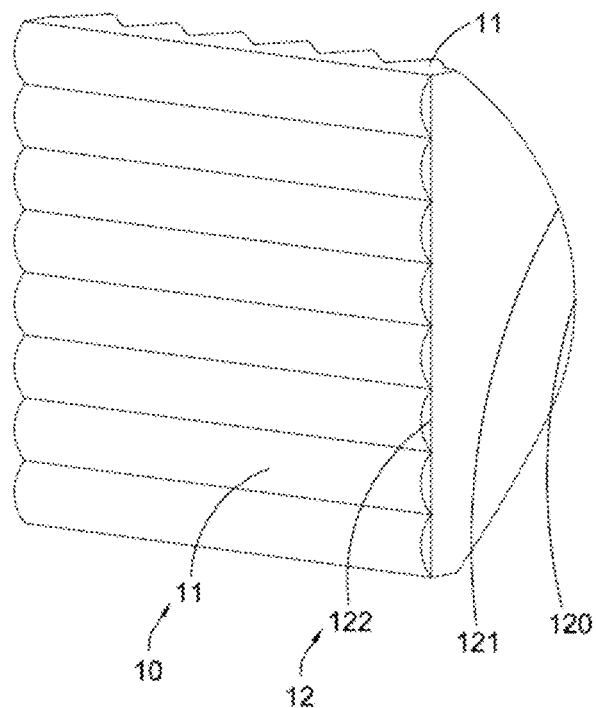
Figure 4C:
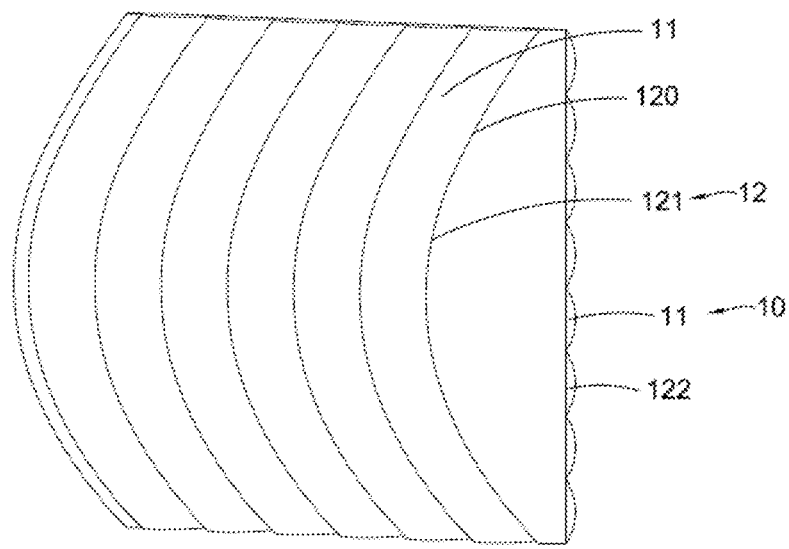

It is worth mentioning that FIGS. 4A to 4C illustrate a first alternative mode of the light field modulator 10 as a first modification thereof according to the above preferred embodiment of the present invention. Comparing to the preferred embodiment of the present invention, the difference between the first alternative mode and the preferred embodiment of the light field modulator 10 is that: there are two beam homogenizers 11 in the light field modulator 10, wherein one of the beam homogenizers 11 is formed on the light incoming surface 121 of the curved light transmitting substrate 12 while another beam homogenizer 11 is formed on the light outgoing surface 122 of the curved light transmitting substrate 12.

Accordingly, when the light beam is modulated by the light field modulator 10, the light beam will pass through the two beam homogenizers 11 and one curved light transmitting substrate 12, such that the light beam will be homogenized twice via the two beam homogenizers 11. Between the two uniforms of the light beam, the light beam is deflected and adjusted its divergence angle range via the curved light transmitting substrate 12. In other words, the light field modulator 10 of the present invention combines the two beam homogenizers 11 on two opposite surfaces of the curved light transmitting substrate 12 to simplify the microstructure of the beam homogenizers 11 and to create two relatively simple microstructures on two surfaces of the curved light transmitting substrate 12. Therefore, the present invention can effectively simplify the complicated structure and manufacturing process of the light field modulator 10, enhance the design and processing flexibility of the light field modulator 10, and reduce the manufacturing cost of the light field modulator 10 at the same time.

Furthermore, in one example as shown in FIGS. 4A to 4C, the light incoming surface 121 of the curved light transmitting substrate 12 is configured in a first direction of a one-dimensional regular micro lens array to mainly adjust the light beam with the uniform light effect in the first direction. The surface configuration of the one-dimensional regular micro lens array is set as:

$$z = \frac{4.4x^2}{1 + \sqrt{1 + 1.95x^2}}$$

Correspondingly, the light outgoing surface 122 of the curved light transmitting substrate 12 is configured in a second direction of a one-dimensional random micro lens array to mainly control the light beam with the uniform light effect in the second direction. The one-dimensional random micro lens array is set as:

$$z = \frac{cy^2}{1 + \sqrt{1 - (1+k)y^2}}$$

wherein c is set with a value between 1 and 2.5, and k is set as a value between −1.2 and −0.9.

Figure 5A:
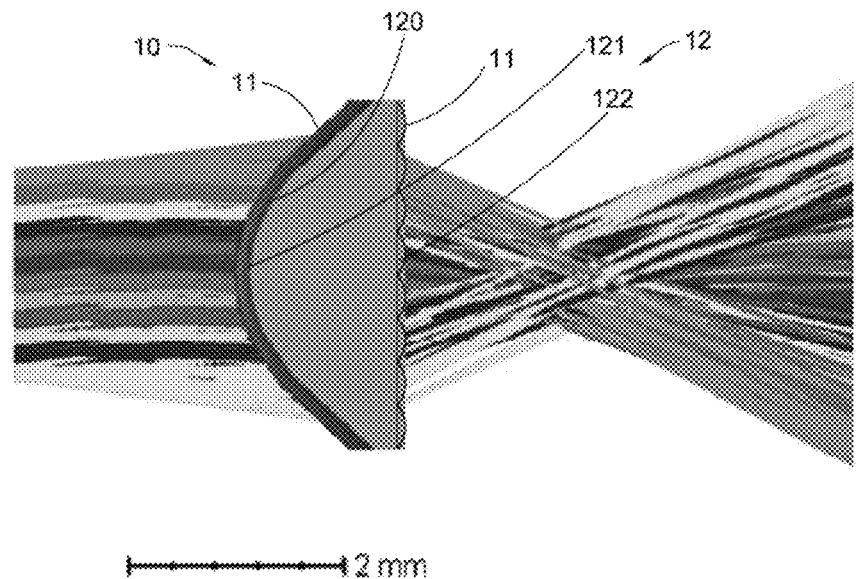
FIG. 5A is a schematic view of the light field modulator of the light modulator according to the above first alternative mode of the present invention, illustrating an optical light path through the light modulator.
Figure 5B:
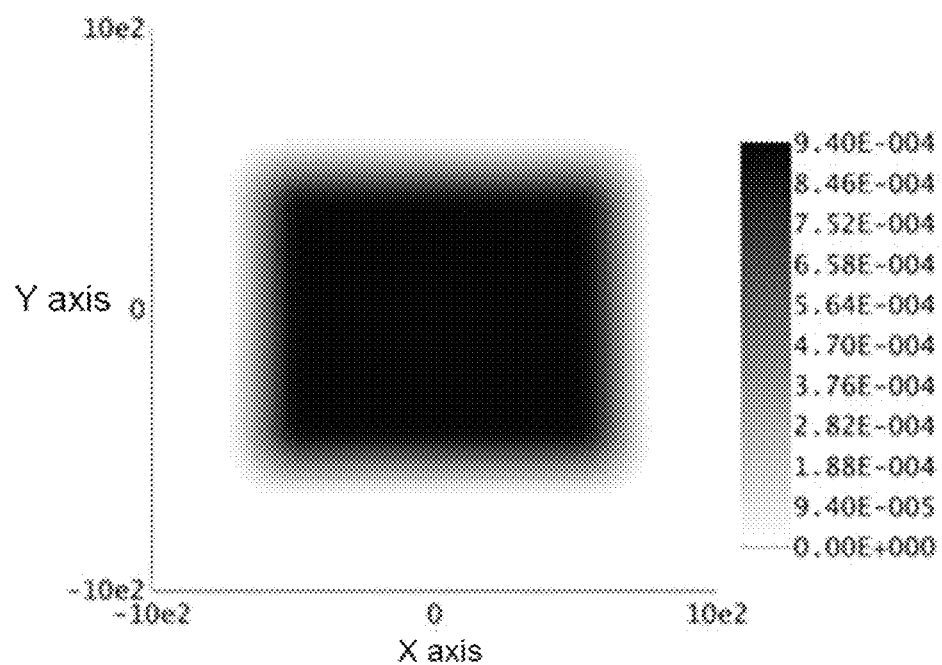
FIG. 5B is a schematic view of the light field modulator of the light modulator according to the above first alternative mode of the present invention, illustrating a formation of an illumination light area after the modulation of the light modulator.

Preferably, one of the beam homogenizers 11 is arranged on one side of the curved light transmitting substrate 12 in the first direction, while another one of the light homogenizing elements 11 is arranged on an opposed side of the curved light transmitting substrate 12 in a second direction, wherein the first direction and the second direction are orthogonal. By adjusting the light beams with the uniform light effect in the first and second directions each light beam can uniformly illuminate the corresponding area after penetrating through the light field modulator 10, as shown in FIGS. 5A and 5B. In other words, the light field modulator 10 of the present invention can significantly correct the distortion of the illumination light area, reduce energy loss, and improve uniformity and window efficiency of the module.

It is worth mentioning that the surface configuration of the one-dimensional regular micro lens array is merely an example, and should not be a limited for the scope of the light field modulator 10 of the present invention. For example, in one embodiment of the present invention, the beam homogenizer 11 is embodied as the one-dimensional regular micro lens array, wherein the surface configuration of the one-dimensional regular micro lens array is set as:

$$z = \frac{c_x x^2}{1 + \sqrt{1 - (1+k_x)x^2}} \text{ or } z = \frac{c_y y^2}{1 + \sqrt{1 - (1+k_y)y^2}}$$

wherein the value range of each of $c_x$ and $c_y$ is from −40 mm-1 to 40 mm$^{-1}$, the value range of each of $k_x$ and $k_y$ is from −100 to 100. In another example of the present invention, the beam homogenizer 11 can be embodied as the one-dimensional random micro lens array, wherein the one-dimensional random micro lens array is set as:

$$z = \frac{c_x x^2}{1 + \sqrt{1 - (1+k_x)x^2}} \text{ or } z = \frac{c_y y^2}{1 + \sqrt{1 - (1+k_y)y^2}}$$

wherein the value range of each of $c_x$ and $c_y$ is from −40 mm-1 to 40 mm$^{-1}$, the value range of each of $k_x$ and $k_y$ is from −100 to 100.

In addition, the one-dimensional structure provided on the two surfaces of the curved light transmitting substrate 12 is simplified to simplify the design and manufacturing process of the light field modulator 10, so as to reduce the manufacturing cost of the light field modulator 10.

Figure 6:
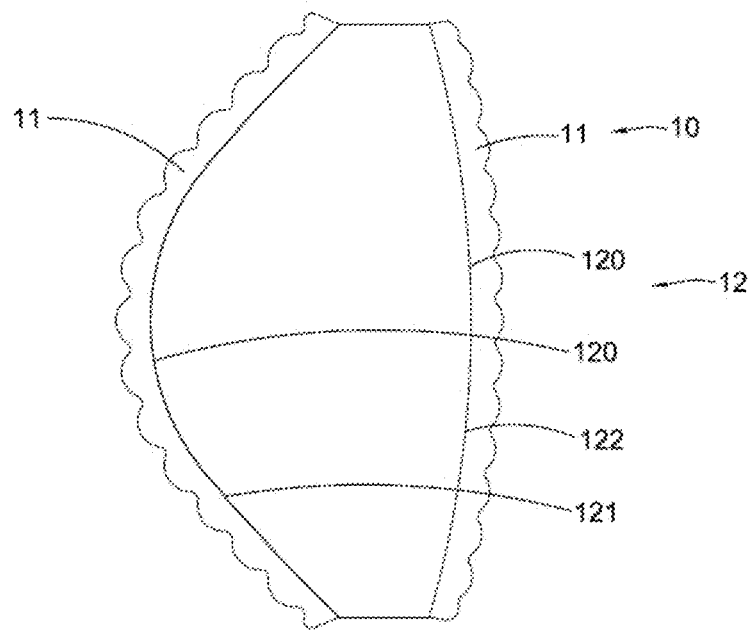
FIG. 6 illustrates a second alternative mode of the light field modulator of the light modulator according to the above preferred embodiment of the present invention.

It is worth mentioning that according to the first alternative mode of the present invention, since the light incoming surface 121 of the curved light transmitting substrate 12 is a curve surface while the light outgoing surface 122 of the curved light transmitting substrate 12 is a flat surface, the light beam is configured not only for being initially uniformed by the beam homogenizer 11 at the light incoming surface 121 of the curved light transmitting substrate 12 but also for performing off-axis distortion correction on the light field formed by the light beam at the same time. Then, after the light beam is deflected and adjusted its divergence angle range through the curved light transmitting substrate 12, the light beam is configured for being secondly uniformed by the beam homogenizer 11 at the light outgoing surface 122 of the curved light transmitting substrate 12 so as to further improve the uniformity of the light field In order to further improve the off-axis distortion correction of the light field modulator 10, a second alternative mode of the preferred embodiment is shown in FIG. 6 as another modification of the preferred embodiment. Comparing to the first alternative mode of the present invention, the difference of the second alternative mode to the first alternative mode is that: both of the light incoming surface 121 and the light outgoing surface 122 of the curved light transmitting substrate 12 are curved surfaces, wherein the light beam is configured not only for being initially uniformed by the beam homogenizer 11 at the light incoming surface 121 of the curved light transmitting substrate 12 but also for performing off-axis distortion correction on the light field formed by the light beam at the same time. Then, after the light beam is deflected and adjusted its divergence angle range through the curved light transmitting substrate 12, the light beam is configured for being secondly uniformed and for being corrected the off-axis distortion at the same time by the beam homogenizer 11 at the light outgoing surface 122 of the curved light transmitting substrate 12 so as to further improve the uniformity of the light field and further improve the off-axis distortion correction for the light beam.

Figure 7:
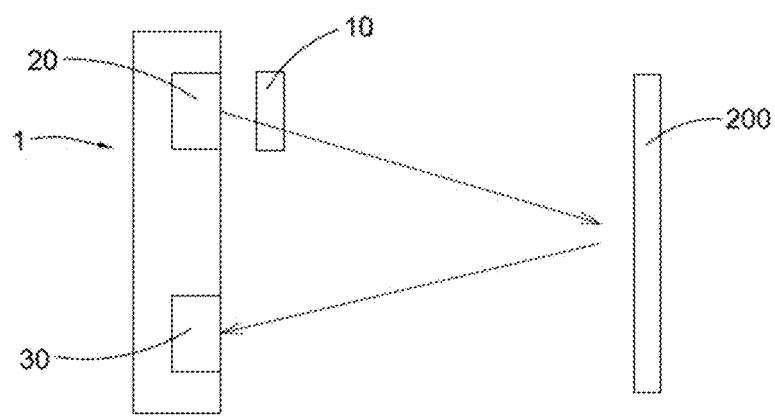
FIG. 7 is a schematic view of a detection module and the light field modulator of the light modulator according to the above preferred embodiment of the present invention.
Figure 8:
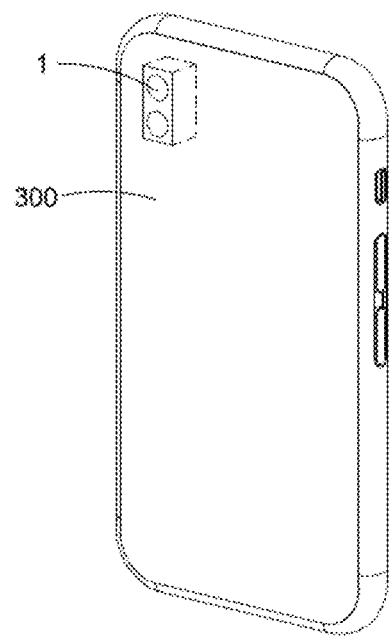
FIG. 8 is a schematic view of an electronic device equipped with the detection module according to the above preferred embodiment of the present invention.

According to another example of the present invention as shown in FIG. 7, the present invention further comprises a detection module 1 operatively connected to the light field modulator 10, wherein the detection module 1 has a detection area 200 configured for detecting depth image information therewithin. Furthermore, as shown in FIG. 8, the detection module 1 can be installed into an electronic device. In other words, the electronic device is constructed to have at least one detection module 1 operatively connected to an electronic device body 300, such that the electronic device is able to acquire real three-dimensional information within the detection area 200.

It is worth mentioning that the specific implementation of the electronic device body 300 or the electronic device should not be limited. For example, the electronic device can be embodied as, but not limited to, a smart phone, a tablet computer, a wearable device, a somatosensory interaction device, a VR device, an AR device, a distance measuring device, a 3D imaging device, or other electronic devices known to those skilled in the art. Furthermore, a person who skilled in the art should understand that the above mentioned application of the detection module 1 is only an example and should not be limited for the scope of the detection module 1 of the present invention. The detection module 1 can also be applied to other fields. For example, the detection module 1 can be applied to, but not limited to, gesture sensing or proximity detection of user interfaces, computers, household appliances, industrial automation, intelligent robots, drone, Internet, or other fields.

Figure 9:
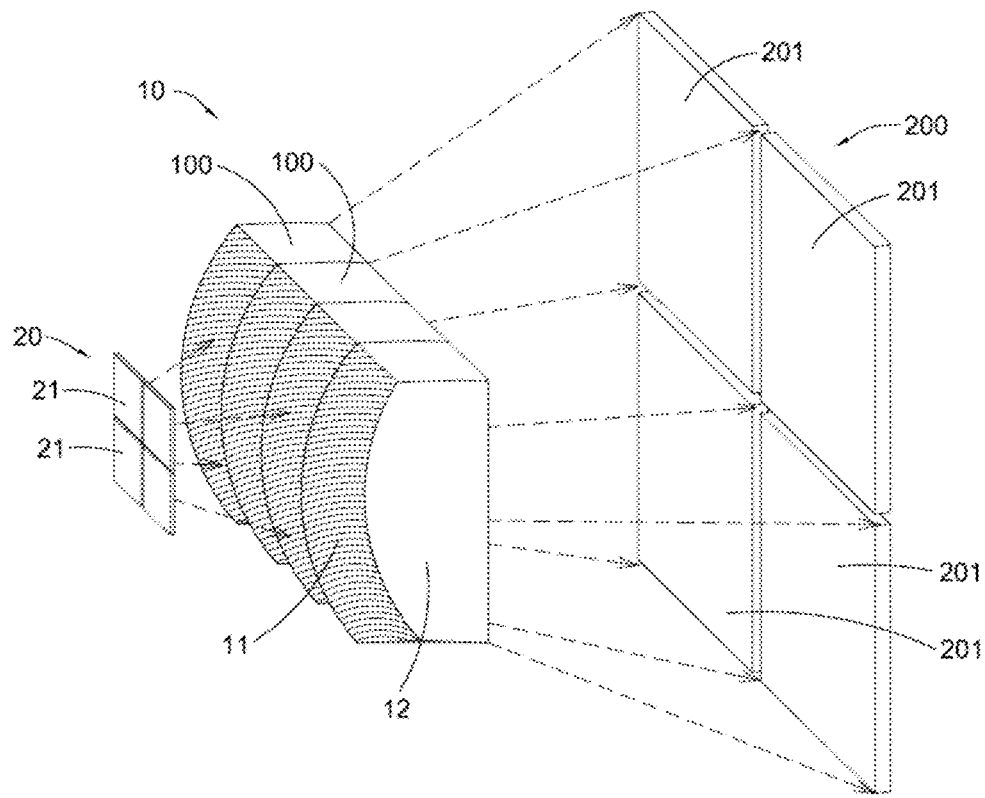
FIG. 9 is a schematic diagram of the detection module of the light modulator according to the above preferred embodiment of the present invention, illustrating the detection principle of the detection module.

Furthermore, as shown in FIG. 9, the detection module 1 can divide the detection area 200 into a plurality of designated areas 201, wherein the designated areas 201 are detected at a predetermined time sequence, such that when the designated areas 201 are completely detected in time sequence, the real three-dimensional information in the detection area 200 is obtained.

Specifically, as shown in FIGS. 7 and 9, the detection module 1 further comprises a detection light source 20 and a light receiving device 30 incorporating with the light field modulator 10, wherein the detection light source 20 is configured to emit a plurality of detection light at a predetermined time sequence and to propagate to the designated areas 201 of the detection area 200 after being modulated by the light field modulator 10. When an object is located at one of the designated areas 201 of the detection area 200, the detection light will be reflected by the object to form a reflected light. The light receiving device 30 is configured to receive the reflected light and combines the detection light and its related information representing the depth image information of the designated area 201. It should be understandable that the light receiving device 30 is configured to calculate the corresponding depth information of the detection area 200 by measuring the flight time of the photon. Alternatively, the light receiving device 30 can calculate the corresponding depth information of the detection area 200 according to information such as the phase difference between the detection light and the reflected light.

It is worth mentioning that, according to the above preferred embodiment of the present invention, as shown in FIG. 9, the detection light source 20 comprises a plurality of illumination light sources 21 which are independently operated, wherein the illumination light sources 21 are configured corresponding to the designated areas 201 of the detection area 200 respectively. The illumination light sources 21 are switched on at the predetermined time sequence, such that the illumination light sources 21 are configured to sequentially generate the detection light to the designated areas 201 in order to detect the depth image information at each of the designated areas 201. In other words, the illumination light sources 21 are switched on sequentially to generate the detection light, the power supply for the illumination light sources 21 will be substantially reduced so as to reduce the power consumption of the detection module 1. Furthermore, under the same power supply condition, comparing to the existing ToF detection device, the detection module 1 of the present invention is able to acquire longer detection distance and to improve the detection range of the detection module 1, so as to achieve the features of long-distance detection and low power consumption of the detection module of the present invention.

It is worth mentioning that the specific number of the illumination light sources 21 of the detection light source 20 should not be limited, wherein two or more of the illumination light sources 21 of the detection light source 20 may be implemented in the present invention. For example, four illumination light sources 21 are used, or a light emitting surface of the detection light source 20 is evenly divided into 4 sub-light-emitting surfaces in a 2*2 manner. Alternatively, fourteen illumination light sources 21 are used, or the light emitting surface of the detection light source 20 is evenly divided into 14 sub-light-emitting surfaces in a 2*7 manner. For another example, twelve illumination light sources 21 are used, or the light emitting surface of the detection light source 20 is evenly divided into 12 sub-light-emitting surfaces in a 1*12 manner. Furthermore, the type of the illumination light source 21 of the detection light source 20 should not be limited. For example, the illumination light source 21 can be, but not limited to, a VCSEL (Vertical Cavity Surface Emitting Laser) light source, EEL (side emitting laser) light source or LED (light emitting diode) light source. A person who skilled in the art should understand that the specific implementations or examples of the illumination light source 21 and the detection light of the detection light source 11 are merely illustrative, and should not be limited for the scope of the detection module 1 of the present invention.

It is appreciated that, in another example of the present invention, the detection light source 20 can be constructed to have only one illumination light source 21, wherein the illumination light source 21 is configured to generate the detection light in a regional manner through the light field modulator 10, so as to illuminate the designated area as required. Therefore, different designated areas are controllably illuminated to complete the regional detection via the detection module 1.

It is worth mentioning that the light field modulator 10 of the present invention is able to solve the problem of distortion when the detection light emitted by the illumination light source 21 passes through a conventional uniform element. Specifically, according to the different arrangements of the illumination light source 21 of the detection light source 20, the off-axis amounts of the illumination light source 21 at different positions are different. When the detection light generated by each illumination light source 21 passes through a conventional modulator, the center direction of the detection light is deflected at different angles. The closer the illumination light source 21 to the edge is, the greater the deflection angle of the detection light is. The distortion must be accurately corrected at the illuminating light area where the greater distortion occurs. Since the amount of distortion of the illumination light area formed by the detection light from the illumination light source 21 at different positions are different, the distortion must be corrected in these positions, such that it is difficult for the manufacturers to design, process, and assemble the detection module 1.

In other words, as different positions and/or different angles of light beams correspond to different off-axis amounts, when different light beams pass through the conventional beam homogenizer the central direction of the light beam is deflected at different angles, wherein the closer to the edge is, the greater the deflection angle of the light beam is. Therefore, the distortion must be accurately corrected at the illuminating light area where the greater distortion occurs. However, since the amount of distortion of the illumination light zone formed by the light beams at different positions are different, the distortion must be corrected in a regional manner, which is difficult to design, process, and assemble.

Figure 10A:
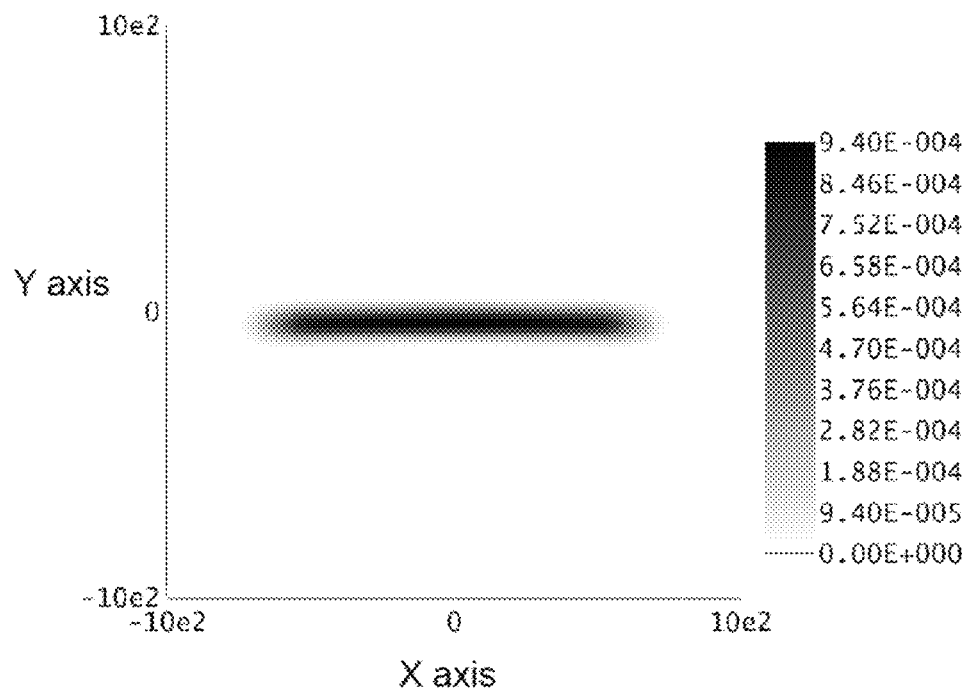
FIGS. 10A to 10G are schematic diagrams illustrating the illumination light area by the detection light before the distortion correction.
Figure 10B:
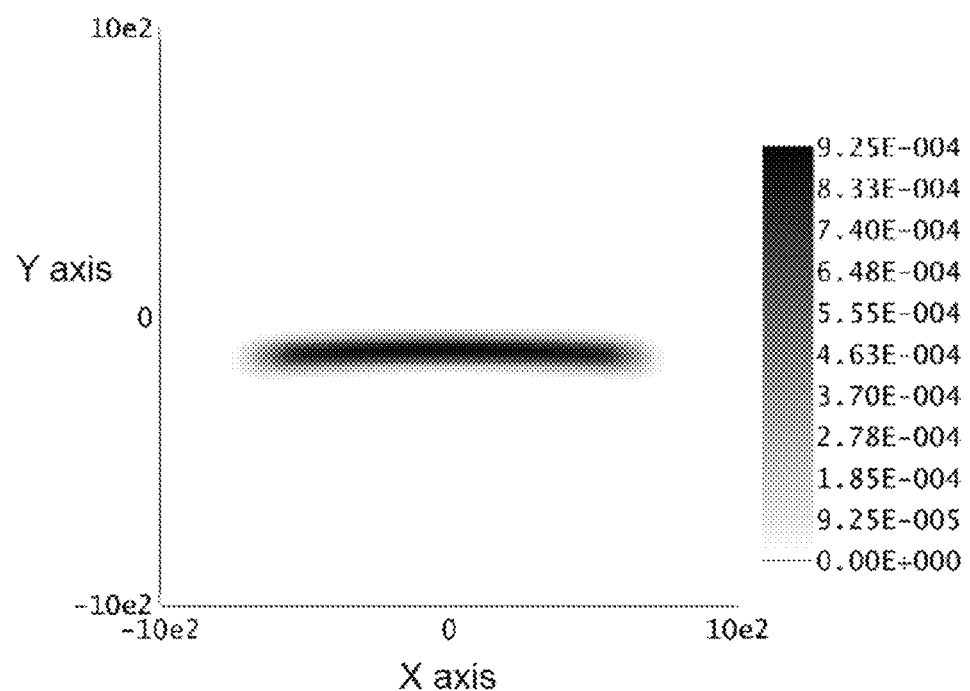
Figure 10C:
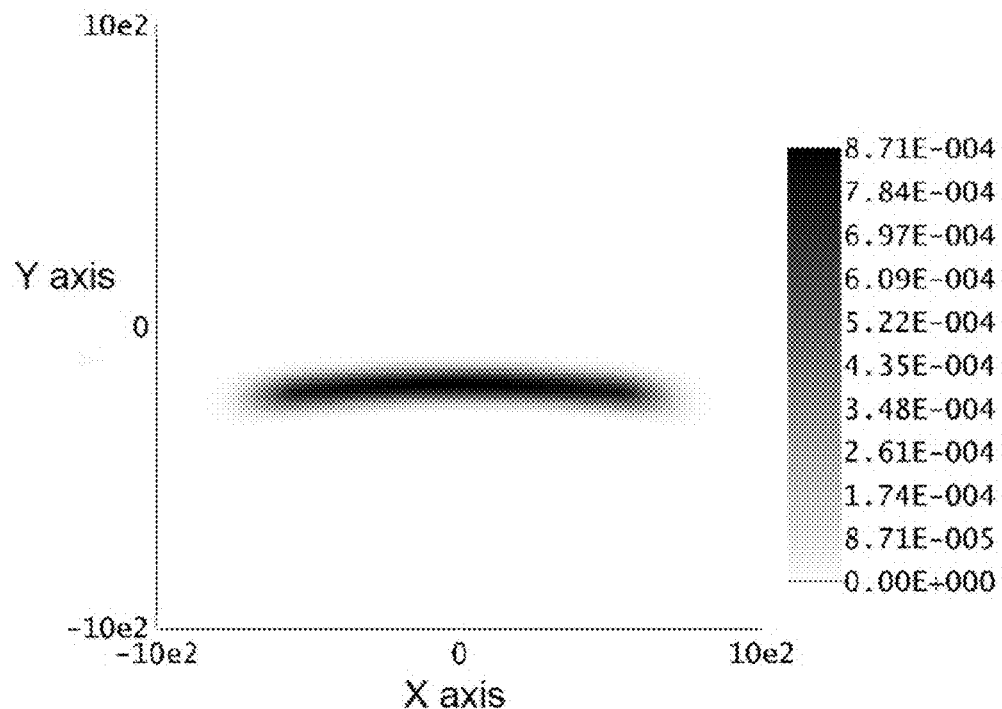
Figure 10:
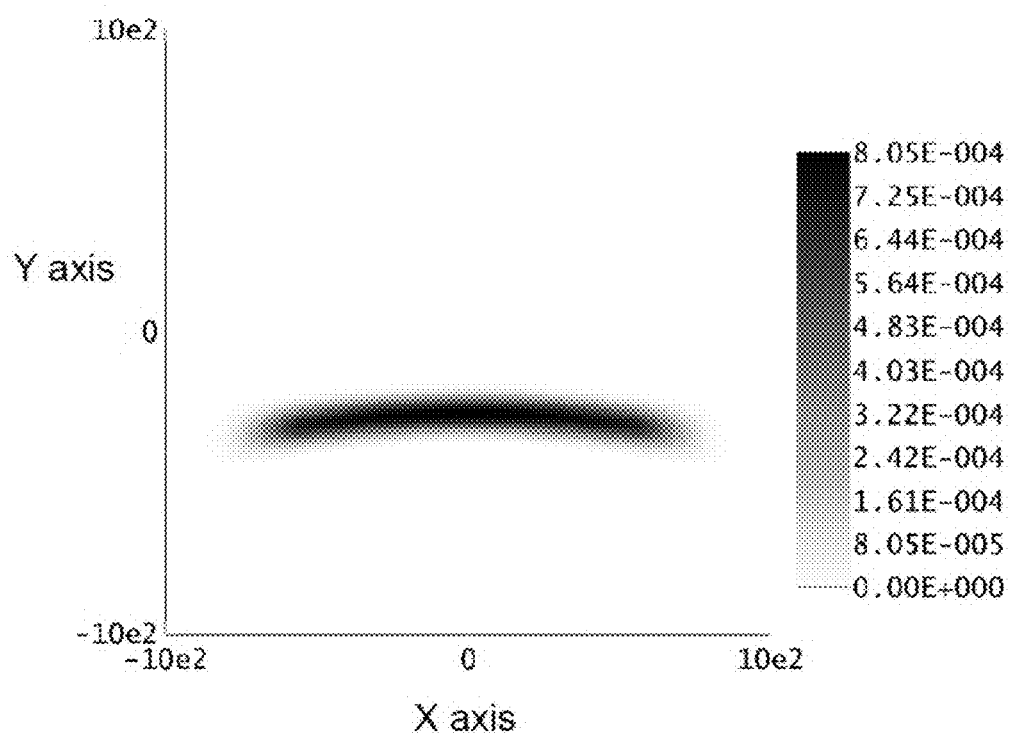
Figure 10E:
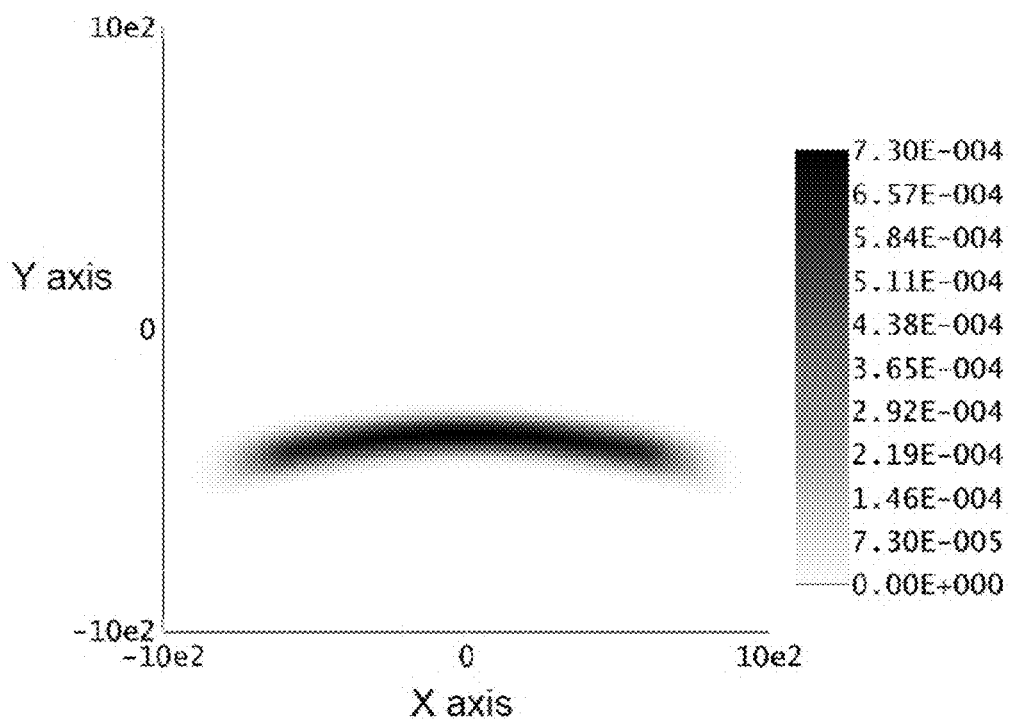
Figure 10F:
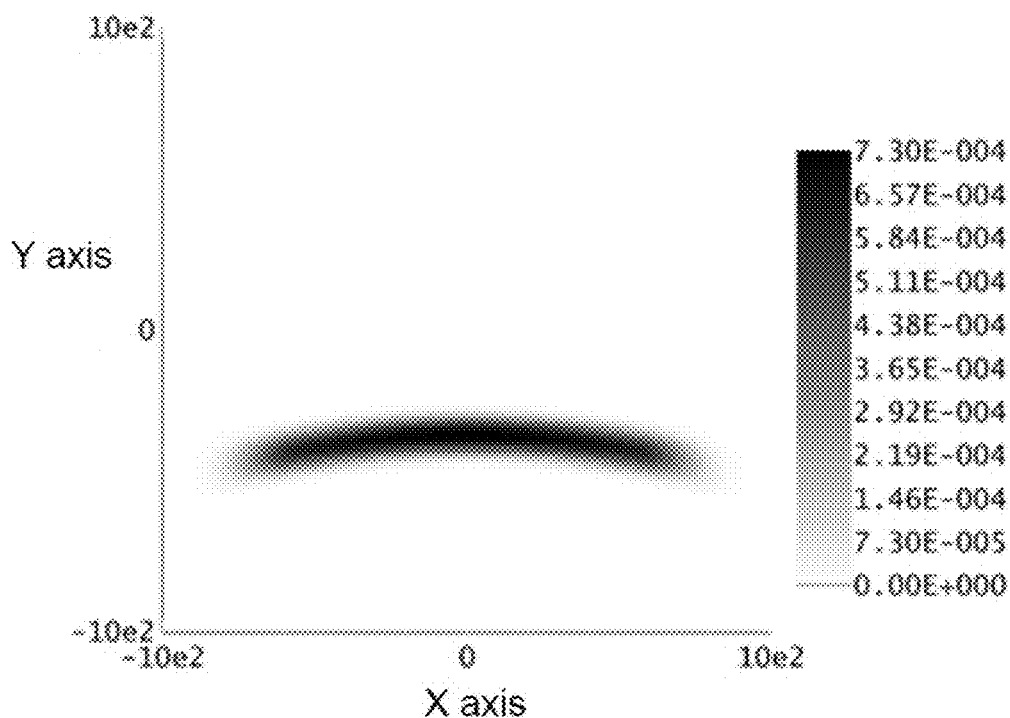
Figure 10G:
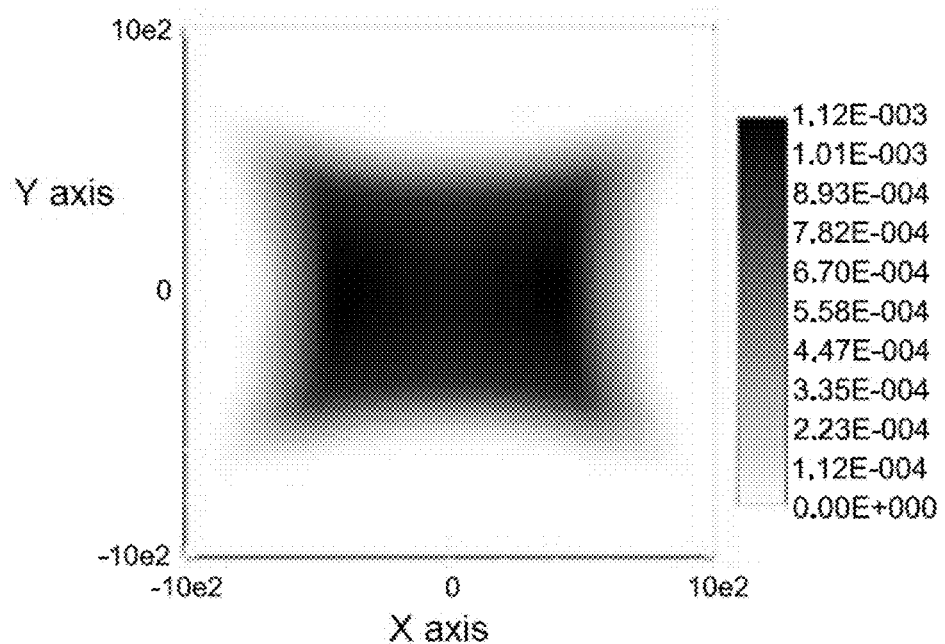

In one example, without accurately correcting the distortion, FIGS. 10A to 10F sequentially illustrate that the illumination light source 21 generates the light beams to illumination light zones at positions from close to the optical axis to far away from the optical axis. FIG. 10G is a schematic diagram of the illumination light zones formed by all the light beams. Accordingly, the illumination light zone illuminated by the detection light near the center is formed in a rectangular shape that the long sides thereof are extended in the horizontal direction while the illumination light zone illuminated by the detection light near the edge is formed in an arc-shape. However, the designated area 201 of the target area 200 is still formed in a rectangular shape, such that only a small area at the center of the designated area 201 will be an effective area among all of the designated areas 201 illuminated by the detection light. In other words, the farther the illumination light source 21 deviates from the optical axis, the greater the distortion of the illumination light zone formed by the detection light is. As a result, the lighting uniformity is poor, the energy utilization is low, the energy loss at the edge is huge, and the window efficiency is low due to the large off-axis distortion.

Figure 11A:
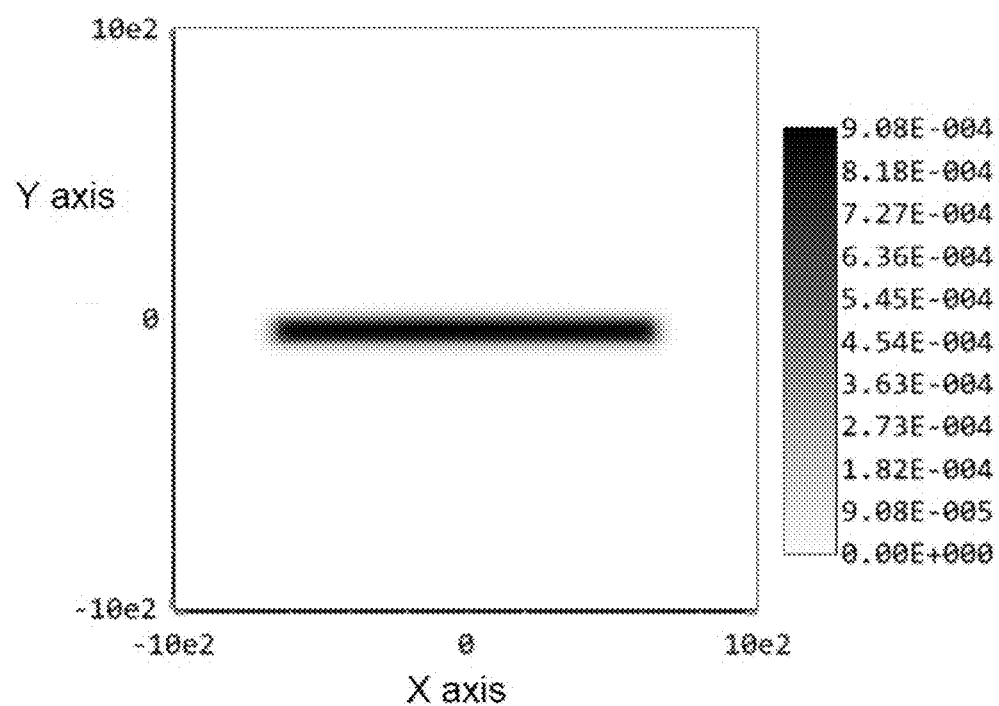
FIGS. 11A to 11G are schematic diagrams illustrating the illumination light area by the detection light after the distortion correction.
Figure 11B:
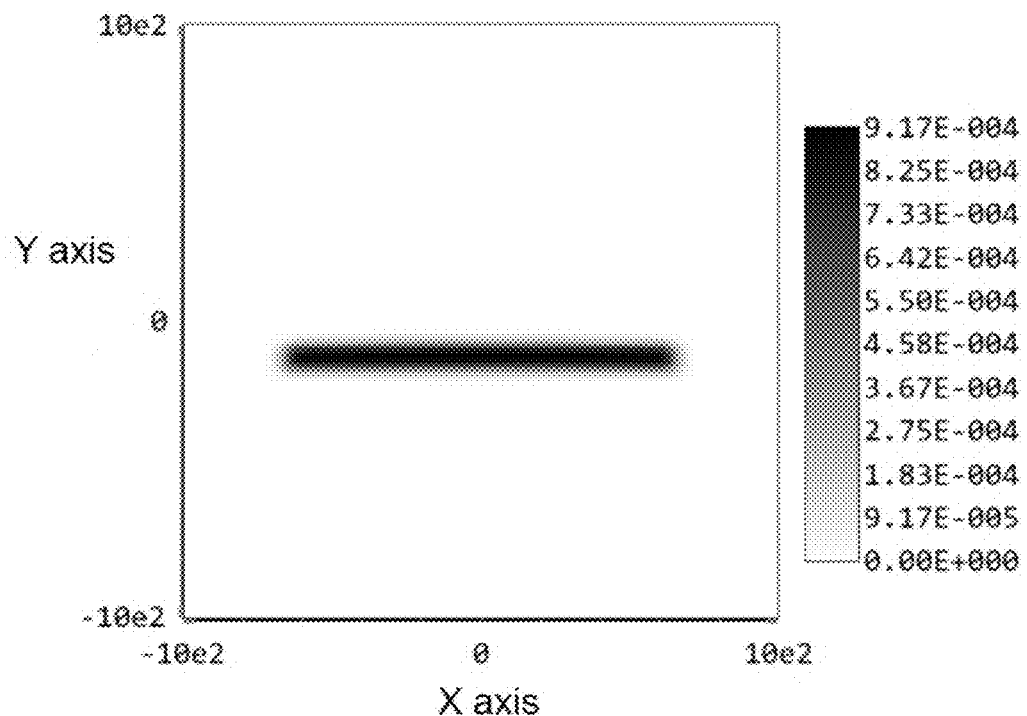
Figure 11C:
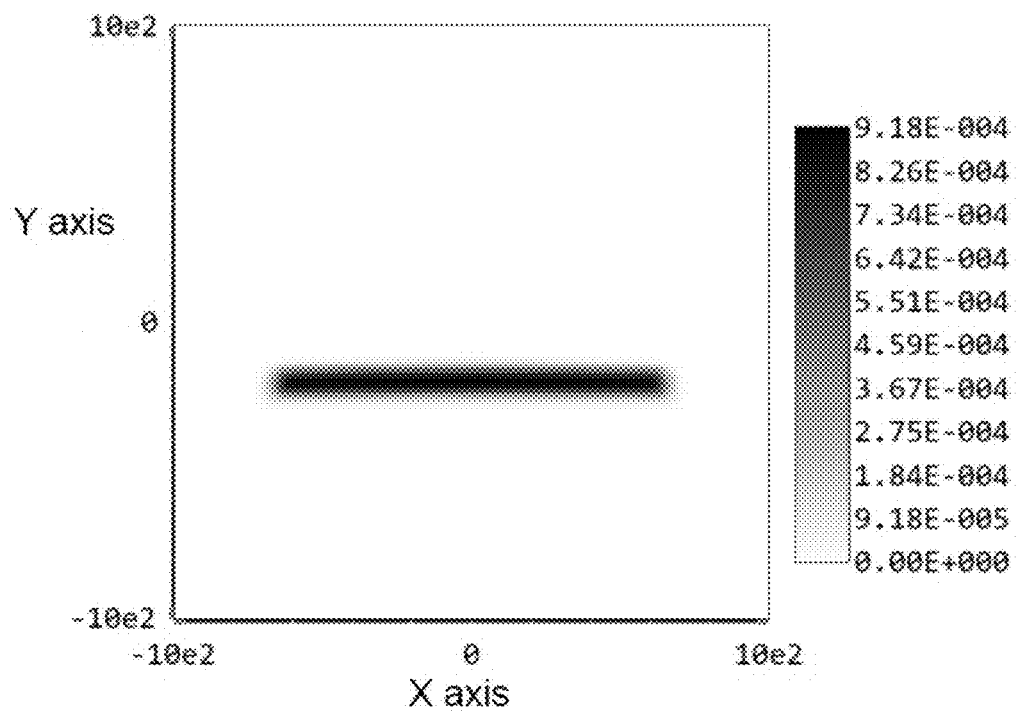
Figure 11D:
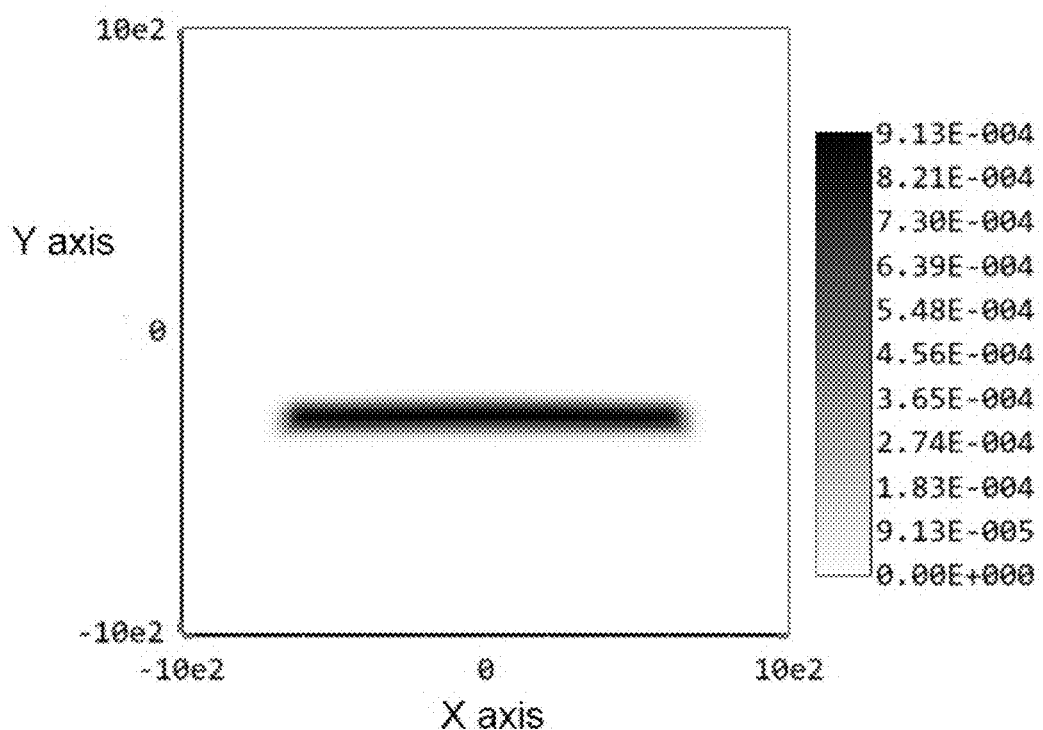
Figure 11E:
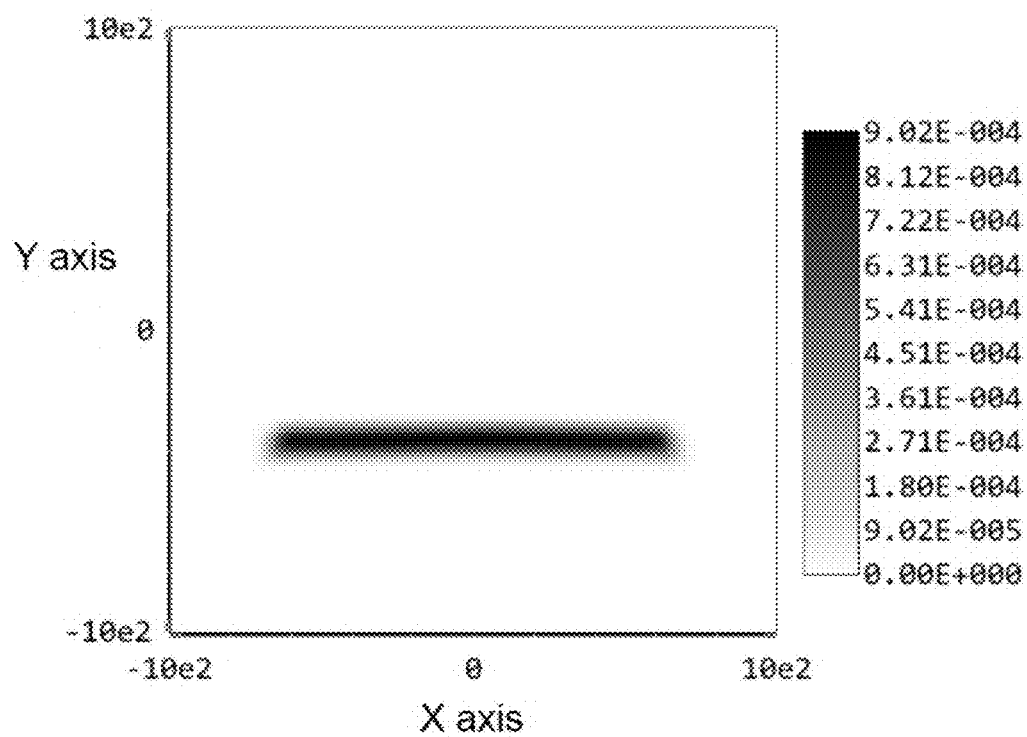
Figure 11F:
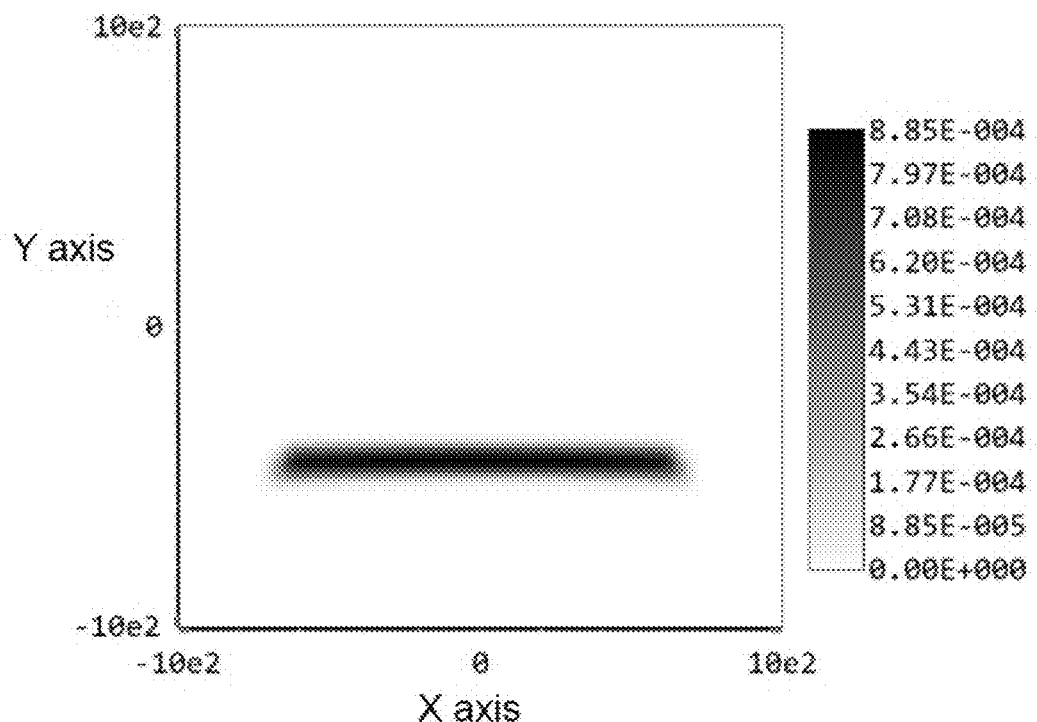
Figure 11G:
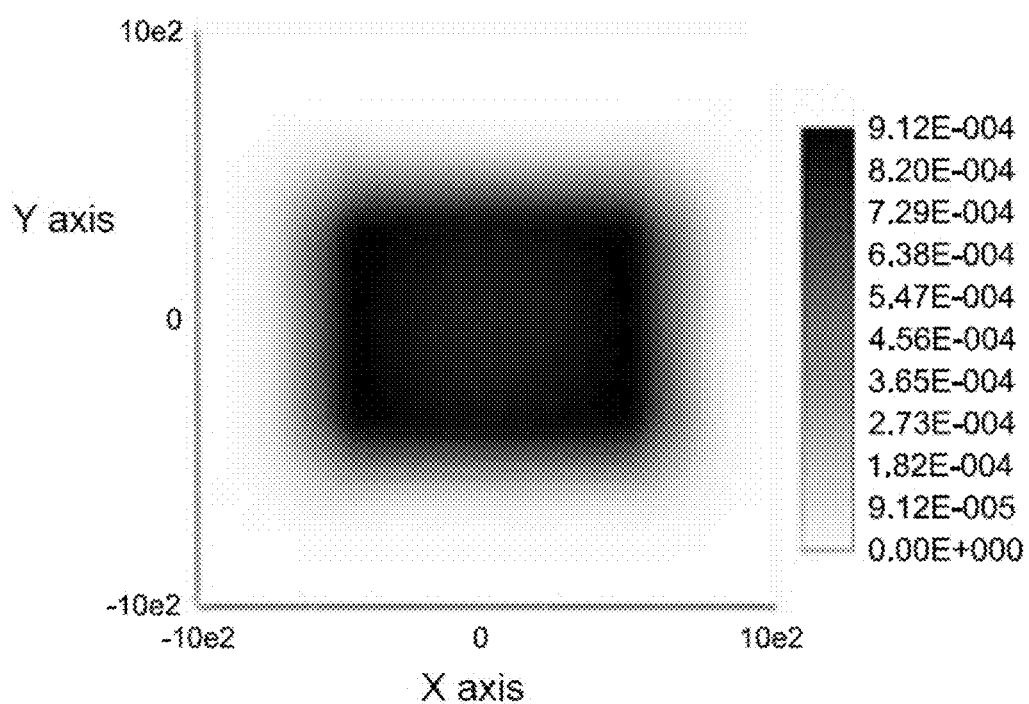

Since the detection light generated by the illumination light source 21 at different positions has almost no distortion in the illumination light zone after the light beams pass through the light field modulator 10 of the present invention, and there is no need to individually correct the distortion of each designated area. For example, without accurately correct the distortion, FIGS. 11A to 11F sequentially illustrate that the illumination light source 21 generates the light beams to illumination light zones at positions from close to the optical axis to far away from the optical axis. FIG. 11G is a schematic diagram of the illumination light zones formed by all the light beams from the illumination light source 21. Accordingly, the illumination light zone illuminated by the detection light from the illumination light source 21 close to the optical axis has a rectangular shape with the long sides in the horizontal direction. The illumination light zone illuminated by the detection light from the illumination light source 21 far away from the optical axis also has a rectangular shape with the long sides in the horizontal direction. So, a large area at the center of the designated area 201 will be an effective area among all of the designated areas 201 illuminated by the detection light. Therefore, the light field modulator 10 can significantly correct the distortion of the illumination light zone, reduce the energy loss, improve the lighting uniformity and the window efficiency of the detection module 1.

It is worth mentioning that it should not be limited to the specific example of the light field modulator 10 of the detection module 1. For example, the beam homogenizer 11 of the light field modulator 10 can use, but not limited to, a diffraction-based method to modulate the detection light, wherein the beam homogenizer 11 of the light field modulator 10 can be a DOE (Diffractive Optical Element) homogenizing layer.

Of course, the traditional homogenizing layer can modulate the detection light based on the scattering principle by adding chemical particles as scattering particles in the homogenizing base material, such that when the light passes through the homogenizing layer, the light will continuously refract, reflect and scatter in two media with different refractive indexes to produce optical homogenization effect. However, such homogenizer based on the scattering principle will inevitably absorb the light by the scattering particles, resulting in low light energy utilization. Furthermore, The light field is uncontrollable, it is difficult to flexibly form the specified light field distribution according to the specified requirements, and it is also prone to uneven light field and "hot spots".

Preferably, according to the preferred embodiment of the present invention, as shown in FIG. 9, the beam homogenizer 11 of the light field modulator 10 may be implemented as a light homogenizing layer based on the principle of light refraction, wherein the light field modulator 10 is divided into a plurality of the light modulation portions 100. In one example, the number of the light modulation portions 100 of the light field modulator 10 is the same as the number of the illumination light sources 21 of the detection light source 20, wherein the light modulation portions 100 are correspondingly set to the illumination light sources 21 in an one-to-one manner.

It should be understood that the homogenizing layer based on the principle of light refraction can also be based on a micro lens array for homogenizing light. In other words, the micro-concave-convex structure on the surface of the micro lens array will refract the light in different directions when passing through, so as to homogenize the light. Since such homogenization is entirely based on the refraction of light by the microstructure of its own surface, there is no light absorption by the scattering particles in the scattering type homogenization layer so as to increase the light energy utilization rate. As a result, by changing the shape and arrangement of the micro lens array, the diffusion angle, the space and energy distribution of the light field can be selectively adjusted.

Preferably, the number of the light modulation portions 100 of the light field modulator 10 is not equal to the number of the illumination light sources 21 of the detection light source 20. In one example of the present invention, one light modulation portion 100 corresponds to at least two illumination light sources 21. In another example of the present invention, at least two of the light modulation portions 100 correspond to one illumination light source 21.

In one embodiment of the detection module 1 of the present invention, the illumination light source 21 of the detection light source 20 is configured to generate the detection light according to the predetermined time sequence and a predetermined rule. Specifically, the illumination light source 21 is configured to sequentially generate the detection light from left to right, right to left, top to bottom, bottom to top, counterclockwise or clockwise according to the predetermined time sequence in order to illuminate the corresponding designated area 201. Furthermore, different illumination light sources 21 illuminate different designated areas 201 at different time, such that the detection of the entire detection area 200 will be completed after the end of the time period. It should be appreciated that in another example of the present invention, the illumination light sources 21 of the detection light source 20 can also be illuminated at the same time to increase the illumination power and expand the illumination range. If it is used in a distance measuring device, the detection distance can be increased.

For example, as shown in FIG. 9, the detection light source 20 is constructed to have four illumination light sources 21 being evenly distributed and arrayed in a 2*2 manner. Correspondingly, the light field modulator 10 is constructed to have four light modulation portions 100 being evenly distributed and arrayed in a 2*2 manner. The illumination light sources 21 are configured to generate the detection light according to a predetermined time sequence and the predetermined rule to illuminate the designated areas 201 respectively. Alternatively, the illumination light source 21 of the detection light source 20 is configured to generate the detection light according to the predetermined timing, such that the illumination light source 21 is sequentially switched on to complete the illumination of the entire detection area 200 in one cycle.

Figure 12:
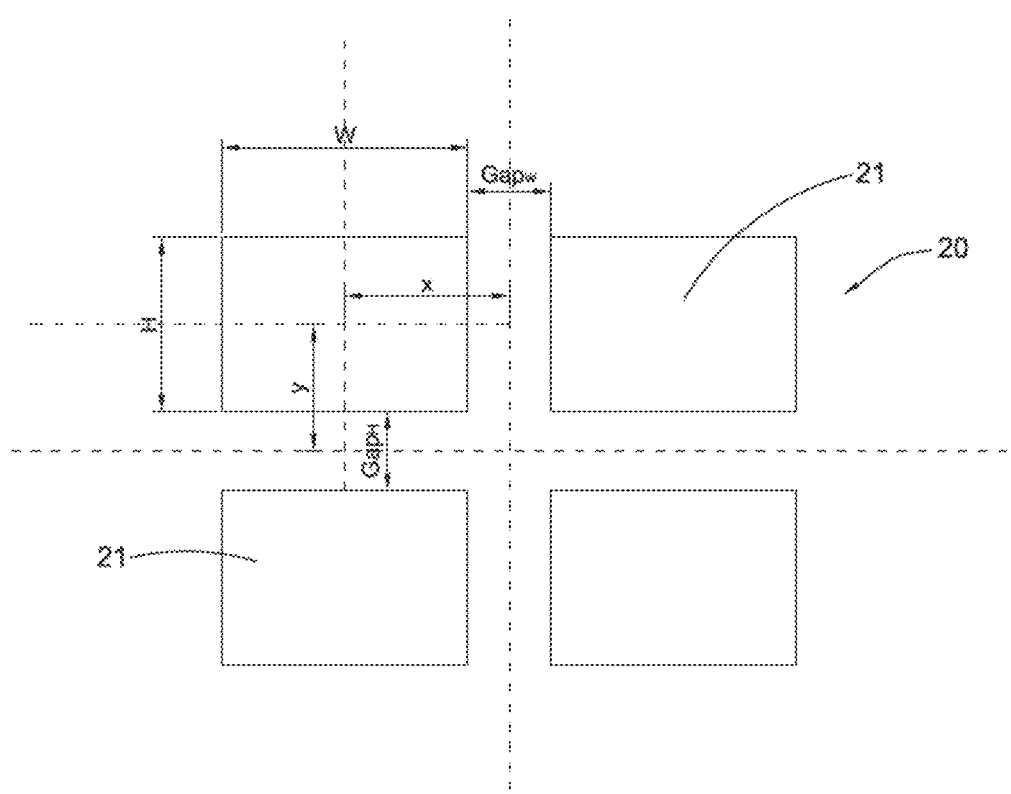
FIG. 12 is a schematic diagram of a detection light source of the light modulator according to the above preferred embodiment of the present invention.

It is worth mentioning that, as shown in FIG. 12, the dimension of a single illumination light source 21 is set as W*H, wherein the horizontal and vertical distance between a center of one of the illumination light sources 21 and a center of the detection light source 20 are set as x and y respectively. A width gap between two adjacent illumination light sources 21 is set as $Gap_W$ and a height gap between two adjacent illumination light sources 21 is set as $Gap_H$. Correspondingly, the diffusion angle of the light field modulator 10 is set as $\theta_{Df-X}$, $\theta_{Df-Y}$, and the focal length of the light field modulator 10 is set as $f_x$, $f_y$, then the field of view $FOV_x * FOV_y$ of the illumination light source 21 are set as:

$$FOV_x = \arctan\left(\frac{x + \frac{W}{2}}{f_x}\right) - \arctan\left(\frac{x - \frac{W}{2}}{f_x}\right) + \theta_{Df-X}$$

$$FOV_y = \arctan\left(\frac{y + \frac{W}{2}}{f_x}\right) - \arctan\left(\frac{y - \frac{W}{2}}{f_x}\right) + \theta_{Df-Y}$$

Figure 13:
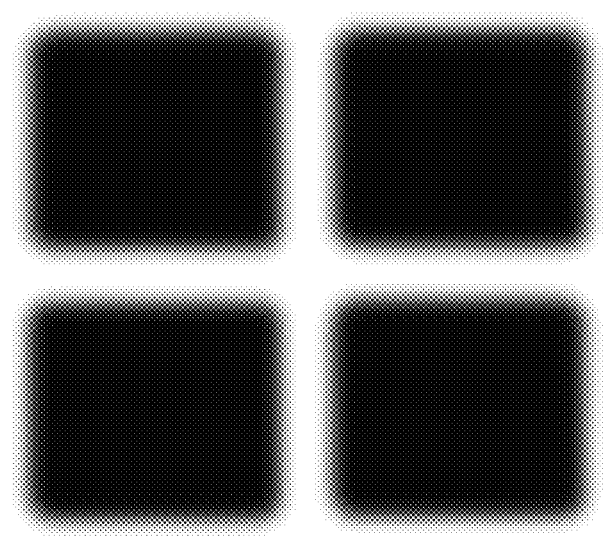
FIG. 13 is a schematic diagram illustrating the illumination light area directly illuminated by the detection light emitted by the detection light source of the light modulator according to the above preferred embodiment of the present invention.

Since there is a gap formed between the adjacent illumination light sources 21, obviously, there will also be a gap between the illumination light zones corresponding to the illumination light sources 21, such that there will be a blind zone between the illumination light sources 21 to form the illumination light zones discontinuously (as shown in FIG. 13). Therefore, if it is used in a three dimensional sensing device, mis-measurement will be happened.

Figure 14:
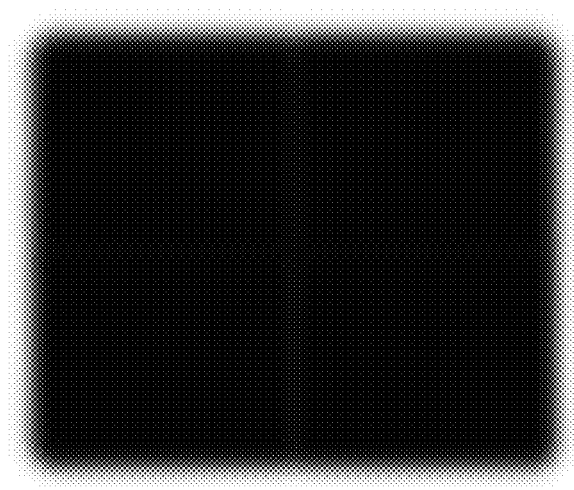
FIG. 14 is a schematic diagram illustrating the illumination light area formed by modulating the detection light of the detection light source via the light modulator according to the above preferred embodiment of the present invention.

Accordingly, since the diffusion angle of the light field modulator 10 of the present invention can be adjusted, the illumination light zones corresponding to the adjacent illumination light sources 21 will be partially overlapped. As a result, the entire light field will be uniform to eliminate any blind spot so as to reduce the sensitivity of the assembling and adjustment processes for the detection light source 20. Preferably, the diffusion angle of the light field modulator 10 of the present invention is adjusted to continuously illuminate the entire detection area 200 as (as shown in FIG. 14):

$$\theta_{DF-X} > 2 * \arctan\left(\frac{Gap_W}{2f_x}\right);$$

$$\theta_{DF-Y} > 2 * \arctan\left(\frac{Gap_H}{2f_y}\right)$$

In one example, the light field modulator 10 of the present invention can optimize the illumination effect at the junction of each of designated areas to partially overlap between adjacent designated areas. Accordingly, an area of a single designated area is w*h, and the actual illumination light zone formed by the corresponding detection light from the illumination light source through the light field modulator 10 of the present invention is w1*h1, where w1≥w, h1≥h, such that the proportion of partially overlap portion can be determined in combination with the light configuration to ensure not only high energy utilization, but also the light uniformity. In addition, the sensitivity of the assembling and adjustment process can be reduced, and the blind spots can be eliminated.

Furthermore, if two directions of the illumination light source of the FoV are different, for example, a linear light projector can be used for illuminating a linear area, 70°*5°. Multiple optical elements will be used in a conventional method, wherein some of the optical elements are configured to compress a small angle direction of the divergence angle, some of the optical elements are configured to stretch a large angle direction of the divergence angle, and some of the optical elements are configured to control the energy distribution of the illumination light zone. Accordingly, one optical element will be used in the present invention, such that the present invention is a single device to provide a highly integrated structure with features of easy to install and adjust, small size, low cost and easy to control the light distribution.

Figure 15:
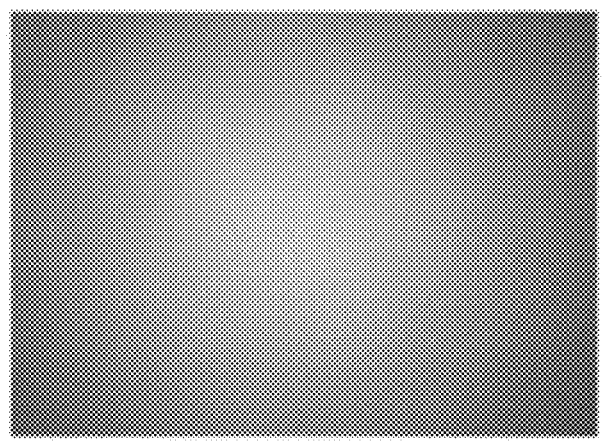
FIG. 15 is a schematic diagram illustrating a vignetting angle of the existing lens.

It is worth mentioning that, for detection modules used for three-dimensional sensing equipment such as solid-state scanning lidar, the light field modulator 10 of the present invention can adjust the surface configuration of the microstructure of the beam homogenizer 11, to compensate the lens shading at the receiver of the module. It should be understood that the lens shading refers to the center area of the image being brighter and the surroundings being darker (as shown in FIG. 15) because of the mechanical structure of the module itself and the optical characteristics of the lens. Specifically, on one hand, during manufacturing and assembling the module, there will be certain process deflects to affect the object light propagation in the module. On the other hand, the lens can be embodied as a convex lens, wherein the converging ability at the center portion of the convex lens has a much larger that at its edge portion, such that the light intensity at the center of the receiving end is greater than that at the edge portion thereof (it is also called light attenuation). For the lens without distortion, the attenuation of the illumination around the image is set corresponding to the attenuation law of $\cos^4\theta$. However, when considering the lens structure and the distortion, the attenuation of the illumination around the image may no longer follow the attenuation law of $\cos^4\theta$. In fact, lens shading always exists in the ToF detection module.

Figure 16A:
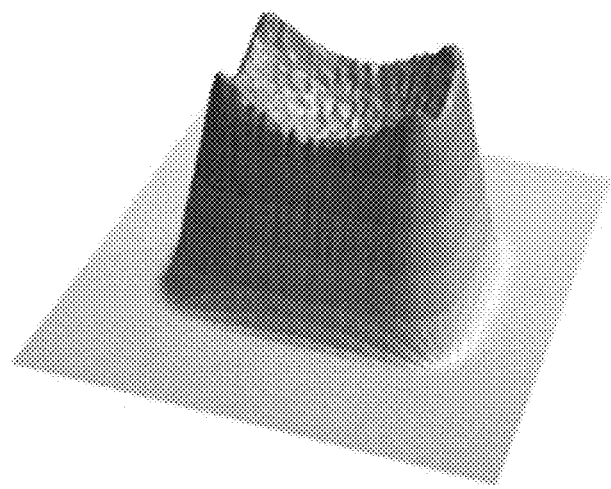
FIG. 16A is a schematic diagram illustrating a light intensity distribution of the illumination light area formed by the light field modulator of the light modulator according to the above preferred embodiment of the present invention.
Figure 16B:
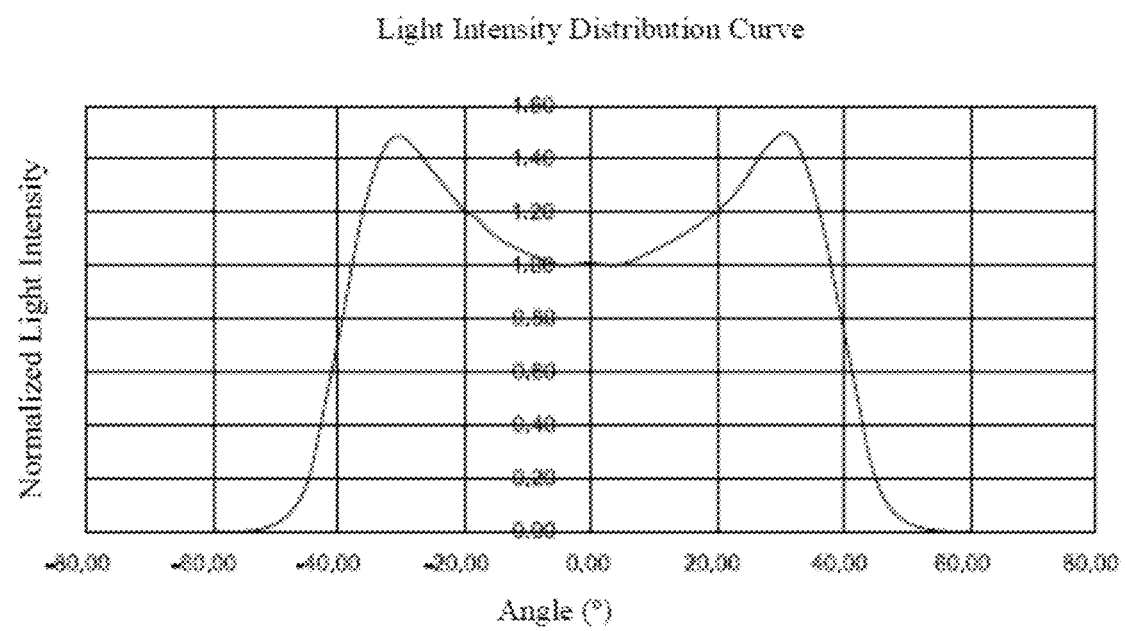
FIG. 16B is a schematic diagram illustrating a light intensity distribution curve of the light field modulator of the light modulator according to the above preferred embodiment of the present invention.

Preferably, the present invention is configured to adjust the surface configuration of the microstructure on the beam homogenizer 11 of the light field modulator 10, that is, optimizes each parameter in $$z = \frac{c_x x^2 + c_y y^2}{1 + \sqrt{1 - (1+k_x)c_x^2 x^2 - (1+k_y)c_y^2 y^2}}$$

for forming an illumination light field that matches with the receiving lens to compensate the shading of the receiving lens. Each unit in the sensor can receive relatively uniform luminance, wherein the signal-to-noise ratio of each light field of view is relatively balanced, such that the detection distance will not be affected due to the lens shading. For example, FIGS. 16A and 16B are the light intensity distribution schematic diagram and light intensity distribution curve of the illumination light field formed by the light field modulator 10 of the present invention respectively.

Figure 17:
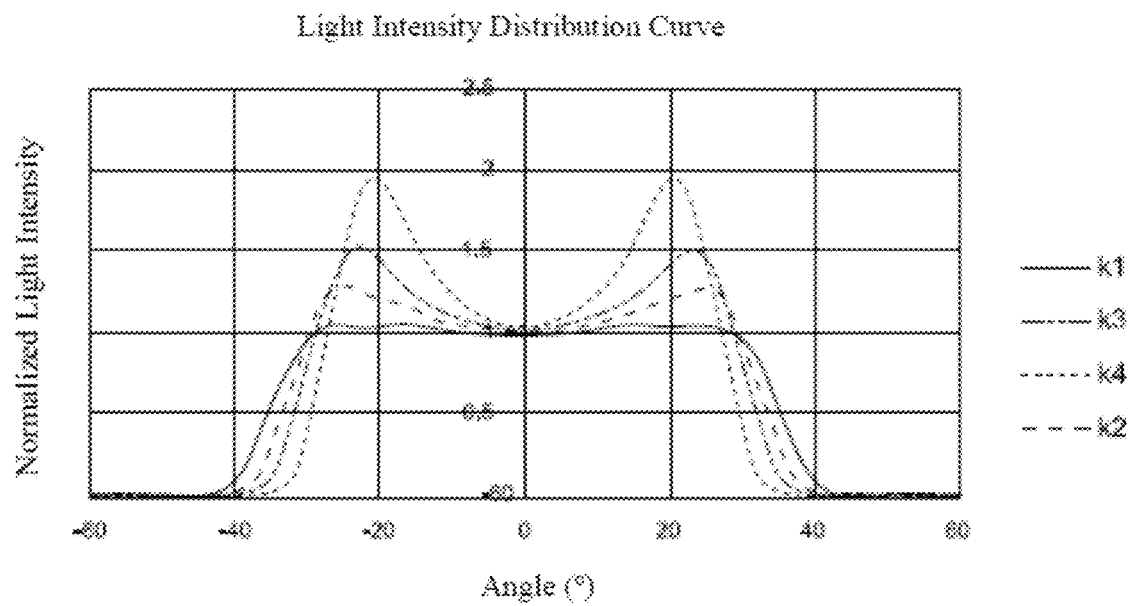
FIG. 17 shows a schematic diagram illustrating the change of the light intensity distribution curve modulated by the light modulator according to the above preferred embodiment of the present invention.

It is worth mentioning that since $c_x$ and $c_y$ are the main factors of the lighting FOV, the larger the absolute values of $c_x$ and $c_y$ are, the larger the lighting FOV is. Correspondingly, the setting of $k_x$ and $k_y$ are main factors of the surface configuration of the micro lens, and further affects the energy distribution of the light field. As shown in FIG. 17, $|k_1|<|k_2|<|k_3|<|k_4|$, the light intensity distribution curve correspondingly changes in a regular manner, i.e. the greater the absolute value of k is, the more the energy of the light field converges around. Therefore, the light field modulator 10 of the present invention is able to adjust the surface parameters of the microstructure and to modulate the light range and light energy distribution.

Figure 18:
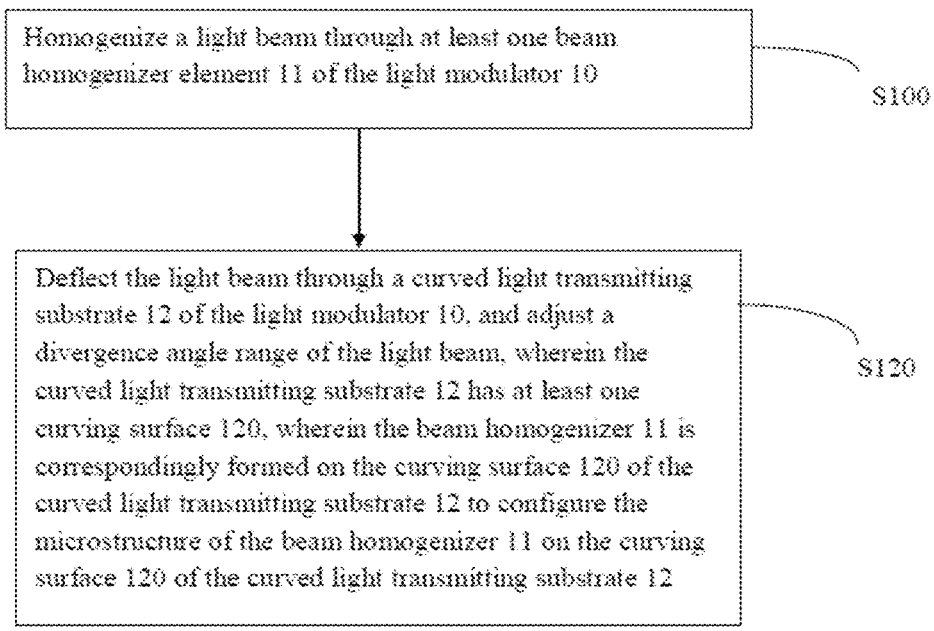
FIG. 18 is a flowchart illustrating a modulation method of the light modulator according to the above preferred embodiment of the present invention.

According to another aspect of the present invention, as shown in FIG. 18, the present invention further provides a modulation method of the light modulator, comprising the following steps.

S100: Homogenize a light beam through at least one beam homogenizer element 11 of the light field modulator 10.

S120: Deflect the light beam through a curved light transmitting substrate 12 of the light field modulator 10, and adjust a divergence angle range of the light beam, wherein the curved light transmitting substrate 12 has at least one curving surface 120, wherein the beam homogenizer 11 is correspondingly formed on the curving surface 120 of the curved light transmitting substrate 12 to configure the microstructure of the beam homogenizer 11 on the curving surface 120 of the curved light transmitting substrate 12.

One skilled in the art will understand that the embodiment of the present invention as shown in the drawings and described above is exemplary only and not intended to be limiting.

It will thus be seen that the objects of the present invention have been fully and effectively accomplished. The embodiments have been shown and described for the purposes of illustrating the functional and structural principles of the present invention and is subject to change without departure from such principles. Therefore, this invention includes all modifications encompassed within the spirit and scope of the following claims.

What is claimed is:

1. A light modulator for an electronic device for acquiring real three-dimensional information, comprising:
    a light field modulator constructed to have one or more light modulation portions, each of said one or more light modulation portions comprising one or more beam homogenizers each having a microstructure and being configured for refracting light in different directions when passing therethrough;
    a curved light transmitting substrate having at least one curving surface, wherein each of said one or more beam homogenizers is provided on said at least one curving surface of said curved light transmitting substrate to configure said microstructure of each of said one or more beam homogenizers on said at least one curving surface of said curved light transmitting substrate; and
    a detection module operatively connected to said light field modulator, having a detection area which is divided into a plurality of designated areas and configured for a depth image information therewith, wherein said plurality of designated areas is detected at a predetermined time sequence, wherein said detection module comprises:
    a detection light source being configured to emit a plurality of detection lights at said predetermined time sequence and to propagate to said plurality of designated areas of said detection area after being modulated by said light field modulator, wherein said detection light source comprises a plurality of illumination light sources which are independently operated, configured corresponding to said one or more light modulation portions and said plurality of designated areas of said detection area respectively, and switched on at said predetermined time sequence, such that said plurality of illumination light sources sequentially generate said plurality of detection lights to said plurality of designated areas in order to detect the depth image information at each of said plurality of designated areas of the detection area; and
    a light receiving device, incorporating with said light field modulator, being configured to receive a reflected light, which are reflected by an object located at one of said plurality of designated areas of said detection area, and combine said plurality of detection lights and a related information thereof representing the depth image information of said one of said plurality of designated areas.

2. The light modulator, as recited in claim 1, wherein a dimension of each of said plurality of illumination light source is set as W*H, wherein a horizontal distance and a vertical distance between a center of each of said plurality of illumination light sources and a center of each of said detection light sources are set as x and y respectively, wherein a width gap and a height gap between two of said plurality of illumination light sources, which are adjacent with each other, are set as $Gap_W$ and $Gap_H$ respectively, wherein a diffusion angle of said light field modulator is set as θDf-X, θDf-Y, and a focal length of said light field modulator is set as $f_x$, $f_y$, wherein a field of view FOVx*FOVy of each of said plurality of illumination light sources are set as $$FOV_x = \arctan\left(\frac{x + \frac{W}{2}}{f_x}\right) - \arctan\left(\frac{x - \frac{W}{2}}{f_x}\right) + \theta_{Df-X}$$

$$FOV_y = \arctan\left(\frac{y + \frac{H}{2}}{f_y}\right) - \arctan\left(\frac{y - \frac{H}{2}}{f_y}\right) + \theta_{Df-Y}.$$

3. The light modulator, as recited in claim 2, wherein illumination light zones corresponding to said plurality of illumination light sources are arranged to be partially overlapped, so that an entire light field is uniform to eliminate any blind spot for the detection light source.

4. The light modulator, as recited in claim 3, wherein a diffusion angle of said light field modulator is adjusted to continuously illuminate said detection area as:

$$\theta_{DF-X} > 2 * \arctan\left(\frac{Gap_W}{2f_x}\right);$$

$$\theta_{DF-Y} > 2 * \arctan\left(\frac{Gap_H}{2f_y}\right)$$

5. The light modulator, as recited in claim 4, wherein an area of each of said plurality of designated areas is w*h, and an actual illumination light zone formed by said detection light from each of said plurality of illumination light sources through said light field modulator is w1*h1, where w1≥w, h1≥h.

6. The light modulator, as recited in claim 5, wherein said curved light transmitting substrate has a light incoming surface and a light outgoing surface opposite to said light incoming surface, wherein said light incoming surface of said curved light transmitting substrate is curved to serve as said curving surface of said curved light transmitting substrate, wherein each of said one or more beam homogenizers is formed on said light incoming surface of said curved light transmitting substrate.

7. The light modulator, as recited in claim 6, wherein when two of said one or more beam homogenizers are provided, one of said two beam homogenizers is formed on said light incoming surface of said curved light transmitting substrate while another one of said two beam homogenizers is formed on said light outgoing surface of said curved light transmitting substrate.

8. The light modulator, as recited in claim 7, wherein said light outgoing surface of said curved light transmitting substrate is a flat surface.

9. The light modulator, as recited in claim 7, wherein said light outgoing surface of said curved light transmitting substrate is a curved surface.

10. The light modulator, as recited in claim 7, wherein one of said two beam homogenizers is formed on one surface of said curved light transmitting substrate in a first direction while another one of said two beam homogenizers is formed on an opposed surface of said curved light transmitting substrate in a second direction, wherein said first direction and said second direction are orthogonal.

11. The light modulator, as recited in claim 3, wherein an area of each of said plurality of designated areas is w*h, and an actual illumination light zone formed by said detection light from each of said plurality of illumination light sources through said light field modulator is w1*h1, where w1≥w, h1≥h.

12. The light modulator, as recited in claim 2, wherein said curved light transmitting substrate has a light incoming surface and a light outgoing surface opposite to said light incoming surface, wherein said light incoming surface of said curved light transmitting substrate is curved to serve as said curving surface of said curved light transmitting substrate, wherein each of said one or more beam homogenizers is formed on said light incoming surface of said curved light transmitting substrate.

13. The light modulator, as recited in claim 12, wherein when two of said one or more beam homogenizers are provided, one of said one or more beam homogenizers is formed on said light incoming surface of said curved light transmitting substrate while another one of said one or more beam homogenizers is formed on said light outgoing surface of said curved light transmitting substrate.

14. The light modulator, as recited in claim 2, wherein said curved light transmitting substrate is a curved lens, wherein said one or more beam homogenizers are overlapped on said curving surface of said curved light transmitting substrate.

15. The light modulator, as recited in claim 2, wherein said curved light transmitting substrate is a curved lens, wherein said one or more beam homogenizers are integrally formed on said curving surface of said curved light transmitting substrate.

16. The light modulator, as recited in claim 2, wherein said beam homogenizer is embodied as a homogenizing layer based on the principle of light refraction or a homogenizing layer based on the principle of light diffraction.

17. The light modulator, as recited in claim 2, wherein said one or more beam homogenizers are selected from a group consisting of a micro lens array composed of convex lenses, a micro lens array composed of concave lenses, a regular micro lens array, a random micro lens array, a spherical lens array, and an aspheric lens array, wherein said curved light transmitting substrate is selected from a group consisting of plano-convex aspheric cylindrical lenses, spherical lenses, aspheric lenses, plano-convex lenses, plano-concave lenses, biconvex lenses, biconcave lenses, and meniscus lenses.

18. The light modulator, as recited in claim 2, wherein said one or more beam homogenizers use a random micro lens array, wherein a surface configuration of each micro lens thereof is set as:

$$z = \frac{cr^2}{1 + \sqrt{1 - (1 + k)c^2 r^2}} + \sum_{i=1}^{N} A_i E_i(x, y)$$

wherein, $$\frac{cr^2}{1 + \sqrt{1 - (1 + k)c^2 r^2}}$$

is a basic aspheric term, where c is a curvature and k is a conic coefficient;

$$\sum_{i=1}^{N} A_i E_i(x, y)$$

is an extended polynomial, where N is a number of polynomials, Ai is a coefficient of the $i^{th}$ extended polynomial term; a polynomial Ei(x,y) is a power series of x and y.

19. The light modulator, as recited in claim 2, wherein said one or more beam homogenizers are a one-dimensional regular micro lens array, wherein a surface configuration of said one-dimensional regular micro lens array is set as:

$$z = \frac{c_x x^2}{1+\sqrt{1-(1+k_x)x^2}} \text{ or } z = \frac{c_y y^2}{1+\sqrt{1-(1+k_y)y^2}}$$

wherein value ranges of $c_x$ and $c_y$ are set between −40 mm$^{-1}$ and 40 mm$^{-1}$; and value ranges of $k_x$ and $k_y$ are set between −100 and 100.

20. A method of acquiring real three-dimensional information for an electronic device, comprising:
sequentially generating and emitting a plurality of detection lights by a plurality of illumination light sources of a detection light source respectively at a predetermined time sequence;
modulating said plurality of detection lights by one or more light modulation portions of a light field modulator by refracting the plurality of detection lights in different direction when passing through one or more homogenizers of said one or more light modulation portions respectively;
propagating said plurality of detection lights after being modulated by said light field modulator to a plurality of designated areas of a detection area respectively corresponding to said one or more light modulation portions; and
detecting said plurality of designated areas at said predetermined time sequence by receiving a reflected light reflected by an object located at one of said plurality of designated areas of said detection area and combining said plurality of detection lights and a related information thereof representing a depth image information of said one of said plurality of designated areas so as to acquire a real three-dimensional information, wherein a dimension of each of said plurality of illumination light source is set as W*H, wherein a horizontal distance and a vertical distance between a center of each of said plurality of illumination light sources and a center of each of said detection light source are set as x and y respectively, wherein a width gap and a height gap between two of said plurality of illumination light sources, which are adjacent with each other, are set as Gap$_W$ and Gap$_H$ respectively, wherein a diffusion angle of said light field modulator is set as θDf-X, θDf-Y, and a focal length of said light field modulator is set as fx, fy, wherein a field of view FOVx*FOVy of each of said plurality of illumination light sources are set as $$FOV_x = \arctan\left(\frac{x+\frac{W}{2}}{f_x}\right) - \arctan\left(\frac{x-\frac{W}{2}}{f_x}\right) + \theta_{Df-X}$$

$$FOV_y = \arctan\left(\frac{y+\frac{H}{2}}{f_y}\right) - \arctan\left(\frac{y-\frac{H}{2}}{f_y}\right) + \theta_{Df-Y}.$$

* * * * *